United States Patent
Kato et al.

(10) Patent No.: US 9,206,546 B2
(45) Date of Patent: Dec. 8, 2015

(54) MOISTURE-PERMEABLE WATERPROOF FABRIC AND PROCESS FOR PRODUCING SAME

(75) Inventors: Yoshiharu Kato, Fukui (JP); Katsumi Sakamoto, Fukui (JP)

(73) Assignee: SEIREN CO., LTD., Fukui (JP)

( * ) Notice: Subject to any disclaimer, the term of this patent is extended or adjusted under 35 U.S.C. 154(b) by 671 days.

(21) Appl. No.: 13/318,232

(22) PCT Filed: Apr. 28, 2010

(86) PCT No.: PCT/JP2010/057634
§ 371 (c)(1),
(2), (4) Date: Jan. 30, 2012

(87) PCT Pub. No.: WO2010/126117
PCT Pub. Date: Nov. 4, 2010

(65) Prior Publication Data
US 2012/0132363 A1    May 31, 2012

(30) Foreign Application Priority Data
May 1, 2009    (JP) .................................. 2009-112062

(51) Int. Cl.
| | | |
|---|---|---|
| *D06M 23/10* | (2006.01) | |
| *D06M 11/76* | (2006.01) | |
| *D06M 15/564* | (2006.01) | |
| *D06M 15/70* | (2006.01) | |
| *D06M 23/00* | (2006.01) | |
| *D06M 23/08* | (2006.01) | |
| *D06N 3/14* | (2006.01) | |
| *B32B 7/12* | (2006.01) | |
| *B32B 27/12* | (2006.01) | |
| *B32B 27/40* | (2006.01) | |

(52) U.S. Cl.
CPC ................. *D06M 23/10* (2013.01); *B32B 7/12* (2013.01); *B32B 27/12* (2013.01); *B32B 27/40* (2013.01); *D06M 11/76* (2013.01); *D06M 15/564* (2013.01); *D06M 15/70* (2013.01); *D06M 23/00* (2013.01); *D06M 23/08* (2013.01); *D06N 3/14* (2013.01); *B32B 2307/54* (2013.01); *B32B 2307/724* (2013.01); *B32B 2307/7265* (2013.01); *D06M 2200/12* (2013.01); *D06N 2205/24* (2013.01); *D06N 2207/06* (2013.01); *D06N 2207/08* (2013.01); *D06N 2209/123* (2013.01); *D06N 2209/128* (2013.01)

(58) Field of Classification Search
CPC ...................... B32B 2307/54; B32B 2307/724; B32B 2307/7265; B32B 27/12; B32B 27/40; B32B 7/12; D06M 11/76; D06M 15/564; D06M 15/70; D06M 2200/12; D06M 23/00; D06M 23/08; D06M 23/10
USPC ................. 428/90; 442/76; 427/342; 156/324
See application file for complete search history.

(56) References Cited

FOREIGN PATENT DOCUMENTS

| | | |
|---|---|---|
| JP | 6-80817 | 3/1994 |
| JP | 8-232171 | 9/1996 |
| JP | 2000-96452 | 4/2000 |
| JP | 2002-201303 | 7/2002 |
| JP | 3-834123 | 7/2006 |
| JP | 2006-274489 | 10/2006 |
| JP | 2007-216657 | 8/2007 |
| JP | 2007-332482 | 12/2007 |
| JP | 2008-144310 | 6/2008 |
| JP | 2008-188808 | 8/2008 |
| WO | 2008/090877 | 7/2008 |

OTHER PUBLICATIONS

International Search Report issued Jul. 20, 2010 in International (PCT) Application No. PCT/JP2010/057634 of which the present application is the national stage.

*Primary Examiner* — Lynda Salvatore
(74) *Attorney, Agent, or Firm* — Wenderoth, Lind & Ponack, L.L.P.

(57) ABSTRACT

A moisture-permeable waterproof fabric which has a well-balanced combination of moisture permeability and waterproofing properties and has excellent strength, in particular, tensile strength, is provided without increasing environmental burden. A synthetic-polymer solution comprising a synthetic polymer consisting mainly of a polyurethane, fine inorganic particles, and a polar organic solvent is applied to one surface of a fibrous fabric and then brought into contact with a gaseous phase in which waterdrops having an average particle diameter of 1-30 μm have been evenly dispersed, thereby making the synthetic polymer semisolid. The fabric is then immersed in water to completely solidify the polymer and thereby obtain a moisture-permeable waterproof fabric comprising the fibrous fabric and, united to one surface thereof, a microporous film of a single-layer structure comprising the synthetic polymer consisting mainly of a polyurethane (the number of micropores having a pore diameter of 0.1-5 μm is $(5\text{-}200) \times 10^4 / \text{mm}^2$ in a vertical cross-section, and the film has a tensile strength of 3-80 MPa, a moisture permeability as measured by the calcium chloride method of 6,000 g/m²·24 hr or higher or a moisture permeability as measured by the potassium acetate method of 6,000 g/m²·24 hr or higher, and a water pressure resistance of 60 kPa or higher).

6 Claims, 4 Drawing Sheets

(a)

(b)

(a)

(b)

(a)

(b)

(a)

(b)

MOISTURE-PERMEABLE WATERPROOF FABRIC AND PROCESS FOR PRODUCING SAME

TECHNICAL FIELD

The present invention relates to a moisture-permeable waterproof fabric and a process for producing the same. In more detail, the present invention relates to a moisture-permeable waterproof fabric which has a well-balanced combination of moisture permeability and waterproofing properties and has excellent strength, in particular, tensile strength, and a process for producing said moisture-permeable waterproof fabric without increasing environmental burden.

BACKGROUND ART

A moisture-permeable waterproof fabric, which has both moisture permeability capable of releasing vapor generated by sweating from the body to out of the clothes and waterproofing properties capable of preventing rainwater from penetrating into the clothes, and is heavily used as a clothing material for sporting and outdoor activities wherein comparatively many amounts of sweating are induced by exercise. As this type of moisture-permeable waterproof fabric, it is well known a layer wherein a resin film of a synthetic polymer is layered with a fabric cloth by a coating method or a laminating. Examples of such resin films include a nonporous film which is formed of a resin having moisture-permeability in itself and a porous layer, including a microporous layer, which does not have moisture-permeability in itself but is given moisture-permeability by forming many pores therein. Among them, a fibrous fabric layered with a porous film is excellent both in moisture-permeability, especially moisture-permeability as measured by the JIS L-1099 A-1 method (the calcium chloride method), and in waterproofing properties, and thus is favorably used.

While there are various methods for forming a porous film, a wet coagulation method is included as a typical method thereof. More precisely, a solution wherein a synthetic polymer consisting mainly of a polyurethane resin is dissolved in an organic solvent compatible with water is applied on a fibrous fabric or a releasable base material to coagulate by immersing them into water, whereby the organic solvent in the resin solution is replaced by water to form a film having many pores. It is known that performance of the moisture-permeable waterproof fabric is largely depending on the size and/or distribution of the pores. In order to improve performance and to stabilize in quality, it has been made a study to control the size and/or distribution of the pores.

In general, a porous film formed by a wet coagulation method has a honeycomb skin-core structure that is a two-layer structure having a inner layer called as a honeycomb layer and an outer layer called as a skin layer. There are very small pores having a pore diameter of not larger than 1 µm in the skin layer, and there are relatively large pores having a pore diameter of not larger than several dozen µm in the honeycomb layer, and they are communicated with each other. The honeycomb layer mainly contributes to moisture-permeability and the skin layer mainly contributes to waterproofing properties. The Patent Document 1 discloses a porous film having such a structure.

That is, the Patent Document 1 discloses a moisture-permeable waterproofing coated fabric having a porous resin layer of a polyurethane-based synthetic polymer on a fibrous fabric, wherein there are pores and micropores of a honeycomb skin-core structure in a cross-section of said resin layer and the longitudinal diameter of the pores present in the honeycomb layer is 1-40 µm, the area ratio thereof is 50-70% and the number thereof is $(2-10) \times 10^3/mm^2$, the longitudinal diameter of the micropores present in the resin layer in whole is not larger than 1 µm, the area ratio thereof is 1-20% and the number thereof is $(1-30) \times 10^5/mm^2$, and has a water pressure residence of 0.6-2.5 $kgf/cm^2$ and a degree of moisture permeability of 8000-12000 $g/m^2 \cdot 24$ hours as measured by the calcium chloride method.

It also discloses, as a production method to obtain such a moisture-permeable waterproofing coated fabric, a method wherein subjecting a fibrous fabric to a wet type coating film-forming treatment after coating thereon a resin mixture solution containing a polyurethane-based synthetic polymer containing not less than 1 wt %, preferably not less than 3 wt % of inorganic particles having an average particle diameter of not larger than 1 µm and an N,N-dimethylformamide adsorption rate of not less than 200 mL/100 g and a polyurethane-based synthetic polymer having a different coagulation value from said polyurethane-based synthetic polymer.

However, since the above moisture-permeable waterproofing coated fabric has relatively large pores present in the honeycomb layer and they dominate a large area ratio (consequently, a large volume ratio) thereof, it is insufficient in waterproofing properties, and thus it is necessary to form another non-porous film thereon in order to obtain sufficient waterproofing properties at practical level.

The Patent Document 2 discloses a moisture-permeable waterproof fabric comprising a microporous film of a urethane resin formed on a fibrous fabric, wherein the microporous film contains preferably 10-100 parts by mass, more preferably 40-70 parts by mass of calcium carbonate particles based on 100 parts by mass of the urethane resin. The microporous film of the moisture-permeable waterproof fabric has fine pores having not larger than around 1 µm on its surface and has pores of 10-50 µm inside.

However, said moisture-permeable waterproof fabric, since having relatively large pores of a honeycomb skin-core structure in the microporous film, also has similar problems as the fabric described in the Patent Document 1.

For the purpose of obtaining a well-balanced combination of moisture-permeability and waterproofing properties fabric, in general, the pores in a porous film are required to be smaller, to be increased in number and to be uniform. For example, the Patent Document 3 discloses a porous sheet material used by means of attaching to or burying in a part of a base material such as a nonwoven fabric, a woven fabric and a knitting fabric, which is obtained by mixing 100 parts by weight of a polar solvent-soluble polymer material with 30-500 parts by weight of a powdery inorganic material and has interconnected pores having an average pore diameter of not larger than 10 µm in the sheet material. It is described that the mixing ratio of the powdery inorganic material is preferably 50-300 parts by weight, more preferably 100-300 parts by weight, and is explained that, by mixing the powdery inorganic material in this range, downsizing of pores and uniformizing of the pore diameters would be more accelerated and an average pore size of the interconnected pores would be 1 µm or smaller.

However, in order to downsize the pore diameter, it would be necessary to mix large amounts of the powdery inorganic material, which might cause deterioration of strength, in particular, tensile strength of the porous sheet material thus obtained, and in the result, problems such as deterioration of waterproofing properties might occur.

Regarding the above problems, the Patent Document 4 disclose a method of producing a moisture-permeable waterproof fabric wherein a synthetic polymer solution consisting mainly of a polyurethane resin containing 15-50 mass % of inorganic fine powder having an average particle diameter of not larger than 0.100 μm and the adsorption amount of N,N-dimethylformamide of not less than 300 mL/100 g based on the total solid content is applied on a fibrous fabric, and subsequently the product thereof is immersed in a N,N-dimethylformamide aqueous solution having the concentration of 10-70%, and then is subjected to hot-water washing and drying.

According to the above method, a moisture-permeable waterproof fabric having a resin layer of substantially single layer structure on a fibrous fabric wherein micropores having the pore diameter of preferably 3.00 μm or less are formed in said resin layer, having a degree of moisture permeability of 7000-12000 g/m²·24 hours as measured by the calcium chloride method and having a water pressure resistance of 120–300 kPa can be obtained.

However, since the coagulated liquid contains a large amount of N,N-dimethylformamide (e.g., 40% in Example), it would be necessary to give consideration to the working environment and the global environment at the time of manufacturing moisture-permeable waterproof fabrics and disposing the coagulated liquid, which would cause an increase in costs.

PRIOR ART DOCUMENTS

Patent Document

Patent Document 1: Jpn. Pat. No. 3834123
Patent Document 2: Jpn. Pat. Laid-Open Publication No. 2007-216657
Patent Document 3: Jpn. Pat. Laid-Open Publication No. 2002-201303
Patent Document 4: Jpn. Pat. Laid-Open Publication No. 2006-274489

DISCLOSURE OF THE INVENTION

Problems to be Solved by the Invention

The present invention is achieved by taking the current situation into consideration, and thus the object of the present invention is to provide a moisture-permeable waterproof fabric which has a well-balanced combination of moisture permeability and waterproofing properties and has excellent strength, in particular, tensile strength without increasing environmental burden.

Means for Solving the Problems

That is, the present invention provides a moisture-permeable waterproof fabric and a process for producing the same shown as follows:

1) A moisture-permeable waterproof fabric comprising a fibrous fabric and, layered to one surface thereof, a microporous layer of a substantially single-layer structure comprising a synthetic polymer consisting mainly of a polyurethane resin, wherein the number of micropores having a pore diameter of 0.1-5 μm in said microporous layer is $(5-200) \times 10^4/mm^2$ in a vertical cross-section thereof, a tensile strength of said microporous layer film is 3-80 MPa, the degree of moisture permeability as measured by JIS L-1099 A-1 method (the calcium chloride method) of said moisture-permeable waterproof fabric is 6,000 g/m²·24 hours or higher or the degree of moisture permeability as measured by JIS L-1099 B-1 method (the potassium acetate method) of said moisture-permeable waterproof fabric is 6,000 g/m²·24 hours or higher, and a water pressure resistance as measured by JIS L-1092 B method (a high water pressure method) of said moisture-permeable waterproof fabric is 60 kPa or higher.

2) The moisture-permeable waterproof fabric according to 1), wherein the area ratio of pores having a pore diameter of larger than 5 μm in said microporous layer is not more than 30% in a vertical cross-section thereof.

3) The moisture-permeable waterproof fabric according to 1) or 2), wherein the number of pores having a pore diameter of larger than 5 μm in said microporous layer is not more than 1,000/mm² in a vertical cross-section thereof.

4) The moisture-permeable waterproof fabric according to 1) to 3), wherein said microporous layer has no pores having a pore diameter of larger than 80% of the thickness of said microporous layer.

5) A process for producing a moisture-permeable waterproof fabric which comprises
applying a synthetic polymer solution comprising a synthetic polymer consisting mainly of a polyurethane resin, 5-75% by weight of fine inorganic particles based on the total solid content and a polar organic solvent to one surface of a fibrous fabric,
bringing said synthetic polymer solution into contact with a gas phase in which water fog having an average particle diameter of 1-30 μm are uniformly dispersed to make the synthetic polymer into semi-coagulation,
and subsequently, immersing said fibrous fabric wherein said synthetic polymer solution is applied in water to completely coagulate.

6) The process for producing a moisture-permeable waterproof fabric according to 5), wherein said step of bringing into contact with said gas phase is carried out by exposing said synthetic polymer solution to a gas phase in which water fog having an average particle diameter of 1-30 μm are uniformly dispersed.

7) The process for producing a moisture-permeable waterproof fabric according to 5), wherein said step of bringing into contact with said gas phase is carried out by spraying a gas phase in which water fog having an average particle diameter of 1-30 μm are uniformly dispersed to said synthetic polymer solution.

8) A process for producing a moisture-permeable waterproof fabric which comprises
applying a synthetic polymer solution comprising a synthetic polymer consisting mainly of a polyurethane resin, 5-75% by weight of fine inorganic particles based on the total solid content and a polar organic solvent to a releasable base material,
bringing said synthetic polymer solution into contact with a gas phase in which water fog having an average particle diameter of 1-30 μm are uniformly dispersed to make the synthetic polymer semi-coagulation,
and subsequently, laminating a microporous layer film obtained by immersing said releasable base material wherein said synthetic polymer solution is applied in water to completely coagulate with one surface of a fibrous fabric via an adhesive.

9) The process for producing a moisture-permeable waterproof fabric according to 8), wherein said step of bringing into contact with said gas phase is carried out by exposing said synthetic polymer solution to a gas phase in which water fog having an average particle diameter of 1-30 μm are uniformly dispersed.

10) The process for producing a moisture-permeable waterproof fabric according to 8), wherein said step of bringing into contact with said gas phase is carried out by spraying a gas phase in which water fog having an average particle diameter of 1-30 μm are uniformly dispersed to said synthetic polymer solution.

Effect of the Invention

The moisture-permeable waterproof fabric of the present invention has a well-balanced combination of moisture permeability and waterproofing properties and is excellent in tensile strength or the like. In addition, it is possible to suppress the use of organic solvents harmful to humans and the global environment to a minimum, and it can be manufactured easily and inexpensively.

MODES FOR CARRYING OUT THE INVENTION

Figure 1:
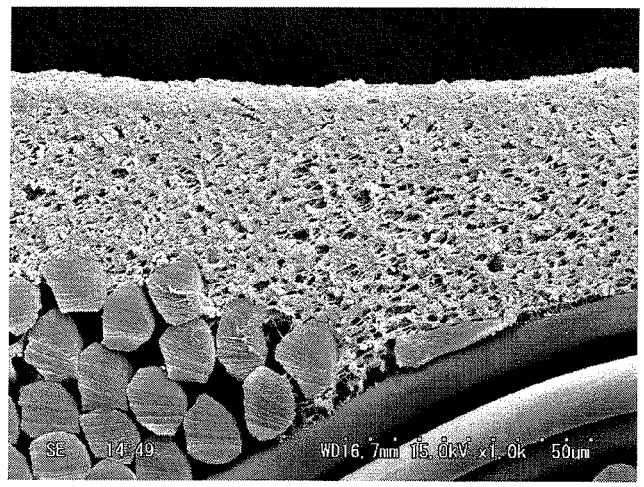
FIG. 1 shows an electron microscope photograph of a vertical cross-section of the moisture-permeable waterproof fabric of Example 1 of the present invention. Of said FIG. 2, (a) is an electron microscope photograph magnified 1000 times. Of said FIG. 2, (b) is an electron microscope photograph magnified 300 times.
Figure 1:
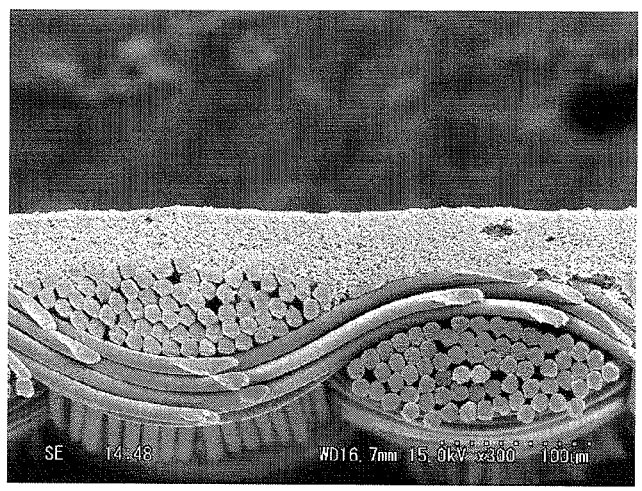

The modes for carrying out the present invention will be described in detail below.
1. Moisture-Permeable Waterproof Fabric
The moisture-permeable waterproof fabric of the present invention is formed of a fibrous fabric and a microporous layer layered on one surface of said fibrous fabric.
(1) Fibrous Fabric
Examples of the forms of fibrous fabrics to be used in the present invention include textile fabrics, knit fabrics and non-woven fabrics. Examples of fiber materials include natural fiber such as cotton, hemp, wool and silk, regenerated fiber such as rayon and cupra, semisynthetic fiber such as acetate and triacetate, and synthetic fiber such as polyamide (nylon 6, nylon 66 and the like), polyester (polyethylene terephthalate, polytrimethylene terephthalate and the like), polyurethane, polyacrylate or the like. Two or more of them can be used in combination with each other. Among them, it is preferable to use a fabric made of synthetic fiber excellent in fabric physical properties overall, in particular, to use a fabric made of polyamide fiber or polyester fiber.

The fibrous fabric can be subjected to, if necessary, not only dyeing but also water-repellent finishing, antistatic finishing, flame retarding and calendaring.

Among them, water-repellent finishing is recommendable because it enables them to improve waterproofing properties and, when layering a microporous layer thereon by a coating method, it can prevent a synthetic polymer solution from permeating deeply into the inside of the fibrous fabric and prevent the texture from hardening. Examples of water-repellent agents to be used include a paraffin-base water-repellent agent, a silicone-base water-repellent agent and a fluorine-based water-repellent agent. Among them, a fluorine-based water-repellent agent is preferable in terms of enabling to give high water-repellent properties without deteriorating adhesion strength with the microporous layer. Water-repellent finishing can be carried out according to common procedures such as a padding method and a spray method.

Furthermore, calendaring is recommendable because it makes it possible to suppress permeation of a synthetic polymer solution into the inside of the fibrous fabric even more, and in addition, to flatten the surface of the fibrous fabric to improve the adhesion strength, even when layering a microporous layer film thereon by a laminating method.

The thickness of the above-mentioned fibrous fabric, though not particularly limited, is preferably 0.02-1 mm.
(2) Microporous Layer
The microporous layer of the present invention is a film of a substantially single-layer structure comprising a synthetic polymer consisting mainly of a polyurethane resin.

The synthetic polymer consisting mainly of a polyurethane resin means a synthetic polymer comprising not less than 50% by weight of polyurethane, preferably not less than 70% by weight of polyurethane, more preferably not less than 80% by weight of polyurethane, wherein not more than 50% by weight of other synthetic polymers compatible with polyurethane can be comprised. Examples of the other synthetic polymers include a polyacrylic resin, a polyamide resin, a polyvinylchloride resin and a polyvinylalcohol resin. These polymers can be combined with polyurethane each independently or two or more of them can be combined with a polyurethane resin.

Examples of the polyurethane resins to be used in the present invention include a polyester-polyurethane resin, a polyether-polyurethane resin, a polyetherester-polyurethane resin, a polycarbonate-polyurethane resin, a modified polyurethane resin that is copolymerized with amino acids, silicone, fluorinated monomers or the like. These polymers can be used each independently or two or more of them can be used in combination with each other. Among them, polyester-polyurethane resin or a polyetherester-polyurethane resin can be suitably used for the reasons that it is inexpensive and is capable of forming a microporous layer easily by a wet coagulation method.

The coagulation value of the polyurethane resin is preferably 3-15% by weight, more preferably 7-12% by weight. The coagulation value here means a value representing the degree of hydrophilicity or hydrophobicity which is a measure of representing a wet coagulation rate. The smaller the value is, the higher the coagulation rate is. The coagulation value can be measured by the method described in Examples below.

When the coagulation value is less than 3% by weight, coagulation of the polyurethane resin tends to occur easily and the resin might be coagulated by an extremely small amount of water, which might make it difficult to form a microporous layer having a sufficient number of uniform and fine pores. When the coagulation value is higher than 15% by weight, coagulation of the polyurethane resin cannot take place easily and it might take a long time to coagulate the resin completely by a wet coagulation method, which might cause a decrease in productivity.

Though the molecular weight of the polyurethane resin is not particularly limited, it is preferably 10,000-200,000, more preferably 30,000-120,000.

Regarding the polyurethane resin, 100% extensional stress in the form of a nonporous film is preferably 1-20 MPa, more preferably 4-12 MPa. When the 100% extensional stress is less than 1 MPa, the microporous layer thus obtained might be too soft and a feeling of tackiness and/or stickiness might be too strong, whereby it might cause an increase of handling difficulty. When the 100% extensional stress is more than 20 MPa, the microporous layer thus obtained might be hard which might cause hardening of texture of the moisture-permeable waterproof fabric. The 100% extensional stress can be measured by the method described in Examples below.

More preferable examples of the polyurethane resins which is the main component of the synthetic polymer constituting the microporous layer of the present invention include a polyurethane resin having the coagulation value of 3-15% by weight and the 100% extensional stress of 1-20 MPa as described above. Most preferable examples thereof include a polyester-polyurethane resin or a polyetherester-polyurethane resin having the coagulation value of 3-15% by weight and the 100% extensional stress of 1-20 MPa.

Other polyurethane resins than the above-mentioned polyurethane resin having the coagulation value of 3-15% by weight and the 100% extensional stress of 1-20 MPa can be comprised as polyurethane which is a main component of the synthetic polymer constituting the microporous layer of the present invention.

However, it is desirable that not less than 50% by weight, more preferably, not less than 70% by weigh of said polyurethane resin having the coagulation value of 3-15% by weight and the 100% extensional stress of 1-20 MPa is comprised based on the total amount of the polyurethane resins which is a main component of the synthetic polymer constituting the microporous layer of the present invention.

The microporous layer formed from the synthetic polymer comprising the above-mentioned polyurethane resin as a main component is required to take a substantial single-layer structure. Taking a substantial single-layer structure means that it does not take a two-layer structure of a honeycomb layer and a skin layer. Furthermore, it means that it has no large pores having the pore diameters of larger than 80% of the thickness of the microporous layer, e.g., pores having a pore diameter of 20 μm to 80 μm, in particular 30 μm to 80 μm, though depending on the thickness of the microporous layer. Therefore, both of moisture permeability and waterproofing properties can be improved.

Pores present in the above-mentioned microporous layer are mainly constituted of micropores having the pore diameter of 0.1-5 μm, preferably micropores having the pore diameter of 0.1-3 μm. In the microporous layer of a substantially single-layer structure of the present invention, micropores having the pore diameter described above are dispersed nearly uniformly in the thickness direction.

In addition, in the microporous layer of the present invention, it is required that the number of micropores having a pore diameter of 0.1-5 μm is $(5\text{-}200) \times 10^4/\text{mm}^2$ in a vertical cross-section thereof. Furthermore, it is preferable that the number of micropores having a pore diameter of 0.1-5 μm is $(10\text{-}200) \times 10^4/\text{mm}^2$ in a vertical cross-section thereof. When the number of micropores having a pore diameter of 0.1-5 μm is less than $5 \times 10^4/\text{mm}^2$, moisture permeability might be insufficient. When the number of micropores having a pore diameter of 0.1-5 μm is more than $200 \times 10^4/\text{mm}^2$, strength, in particular, tensile strength of the microporous layer might be deteriorated and waterproofing properties might be insufficient.

It does not mean that there are no pores having the diameter of less than 0.1 μm or pores having the diameter of more than 5 μm. In particular, the lower limit of 0.1 μm means that the pore diameter of the micropores which can be examined by an electronic microscope at a magnification of 5000 is not less than 0.1 μm. It can be thought that, on the surface of the microporous layer and the walls of micropores, there are a number of extremely fine pores that water vapor having the diameter of approximately 0.0004 μm can permeate thereto.

Meanwhile, regarding the pores having the pore diameter of larger than 5 μm, since pores having the pore diameter of larger than 5 μm may be formed in the process of processing, the existence of pores having the pore diameter of larger than 5 μm can be permissible as far as the moisture-permeable waterproof fabric satisfies the requirements in water pressure resistance and tensile strength. However, since sufficient waterproofing properties may not be achieved when there are too many pores having the pore diameter of larger than 5 μm, it is preferable that the pores having the pore diameter of larger than 5 μm are nonexistent as much as possible. Regarding the moisture-permeable waterproof fabric of the present invention, the number of the pores having the pore diameter of larger than 5 μm present in the above-mentioned microporous layer is preferably not more than $1,000/\text{mm}^2$, more preferably not more than $500/\text{mm}^2$, most preferably not more than $200/\text{mm}^2$ in a vertical cross-section.

In addition, the area ratio of the total area of micropores having the pore diameter of 0.1-5 μm present in the above-mentioned microporous layer and division walls being present at the periphery of said micropores and forming said micropores, i.e. the area in which the micropores having the pore diameter of 0.1-5 μm are present, is preferably not less than 70%, more preferably not less than 85%, most preferably not less than 95% in a vertical cross-section. Meanwhile, the area ratio of pores having the diameter of larger than 5 μm is preferably not more than 30%, more preferably not more than 15%, most preferably not more than 5% in a vertical cross-section. When the area ratio of pores having the diameter of larger than 5 μm in a vertical cross-section is more than 30%, strength of the microporous layer may be deteriorated or sufficient waterproofing properties may not be achieved.

The thickness of the microporous layer is preferably 5-100 μm, more preferably 10-80 μm. When the thickness is less than 5 μm, sufficient waterproofing properties may not be achieved. When the thickness is more than 100 μm, sufficient moisture permeability may not be achieved. Since there is roughness on the surface of fibrous fabric, when using a coating method wherein a synthetic polymer solution is applied directly thereon, the thickness of the microporous layer thus obtained varies partially in a precise sense, but it is no matter as long as the thickness thereof is approximately in the above-mentioned range.

Tensile strength of the microporous layer is required to be 3-80 MPa, preferably 5-60 MPa. When tensile strength thereof is less than 3 MPa, sufficient waterproofing properties may not be achieved. When tensile strength thereof is more than 80 MPa, porosity may be too small and sufficient moisture permeability may not be achieved. Tensile strength can be measured by the method described in Examples below.

(3) Moisture-Permeable Waterproof Fabric

Regarding moisture permeability of the moisture-permeable waterproof fabric of the present invention, it is required that the degree of moisture permeability as measured by JIS L-1099 A-1 method (the calcium chloride method) thereof is 6,000 g/m²·24 hours or higher, or the degree of moisture permeability as measured by JIS L-1099 B-1 method (the potassium acetate method) thereof is 6,000 g/m²·24 hours or higher.

The degree of moisture permeability as measured by JIS L-1099 A-1 method is more preferably 6,000-13,000 g/m²·24 hours, most preferably 8,000-13,000 g/m²·24 hours.

The degree of moisture permeability as measured by JIS L-1099 B-1 method is more preferably 6,000-25,000 g/m²·24 hours, most preferably 8,000-25,000 g/m²·24 hours.

When the degree of moisture permeability is less than the lower limit, sufficient moisture permeability may not be achieved. That is, when wearing it as clothes, there may be a feeling of sweat and a comfortable feeling may be lost. When the degree of moisture permeability is higher than the upper limit, sufficient waterproofing properties may not be achieved.

Regarding waterproofing properties of the moisture-permeable waterproof fabric, a water pressure resistance thereof as measured by JIS L-1092 B method (a high water pressure method) is required to be 60 kPa or higher, preferably 60–250 kPa, most preferably 80–250 kPa. When water pressure resistance is less than 60 kPa, sufficient waterproofing properties may not be achieved. That is, when wearing it as clothes, penetration of rain water may not be prevented. When water pressure resistance is higher than 250 kPa, sufficient moisture permeability may not be achieved.

According to the JIS L-1092 B method (a high water pressure method), the water pressure is applied from the obverse side of a test piece and the water pressure at the time that water is leaked out from 3 points on the reverse side is measured to obtain the value of a water pressure resistance. However, since measurement values measured by water leak of only 3 points vary widely depending on the test pieces, the value is not necessarily highly reliable. Therefore, in Examples described below, as the more reliable values of a water pressure resistance, the measurement value measured at the time that water is leaked out from 10 points is used as the value of "a 10-point leak water pressure resistance", and the measurement value measured at the time that water is leaked out from 50-100 points is used as the value of "a whole-surface leak water pressure resistance", and using these measurement values, a discussion was made in combination with the measurement value measured by the JIS L-1092 B method (a high water pressure method) (herein after, "3-point leak water pressure resistance").

2. Process for Producing Moisture-Permeable Waterproof Fabric (Coating Method)

The above-described moisture-permeable waterproof fabric can be produced by, for example, applying to one surface of a fibrous fabric a synthetic polymer solution comprising a synthetic polymer consisting mainly of a polyurethane resin, 5-75% by weight of fine inorganic particles based on the total solid content and a polar organic solvent, then bringing said synthetic polymer solution into contact with a gas phase in which water fog having an average particle diameter of 1-30 μm are uniformly dispersed to make the synthetic polymer semi-coagulation, and subsequently, immersing said fibrous fabric wherein said synthetic polymer solution is applied in water to completely coagulate (the coating method).

(1) Synthetic Polymer Solution

The synthetic polymer solution to be used for producing the moisture-permeable waterproof fabric is a solution wherein the synthetic polymer consisting mainly of a polyurethane resin is dissolved in a polar organic solvent in a concentration of preferably 10-40% by weight, more preferably 15-40% by weight based on the total weight of the solution. When the concentration is lower than 10% by weight, strength, in particular tensile strength of the microporous layer thus obtained may be deteriorated and sufficient waterproofing properties may not be achieved. When the concentration is higher than 40% by weight, porosity of the microporous layer thus obtained may be too small and sufficient moisture permeability may not be achieved.

Examples of the polar organic solvents include N,N-dimethylformamide, N,N-dimethylacetamide, dimethylsulfoxide, tetrahydrofuran, dioxane, and N-methylpyrrolidone. These can be used each independently or two or more of them can be used in combination with each other. Among them, N,N-dimethylformamide is preferable for the reason that it is excellent in solubility with polyurethane and in compatibility with water, and thus, in the process of immersing said solution of a synthetic polymer consisting mainly of a polyurethane resin into water to coagulate the synthetic polymer, prompt replacement with water is promising.

The synthetic polymer solution further comprises fine inorganic particles as an essential component. Since the fine inorganic particles are highly compatible with a polar organic solvent, the polar organic solvent is located in the state that the solvent surrounds the circumference of the fine inorganic particles in the solution, and thus, the concentration of the polar organic solvent becomes high locally. Therefore, pores are formed around the fine inorganic particles in the process of immersing said synthetic polymer solution into water to coagulate the synthetic polymer. As a result, micropores can be formed efficiently in the resin film.

Examples of the fine inorganic particles include fine particles of carbonates such as calcium carbonate and magnesium carbonate, silicic acids such as silicon dioxide and diatomaceous earth, silicates such as talc and zeolite, hydroxides such as aluminum hydroxide and magnesium hydroxide, hydrosulfates such as barium sulfate and calcium sulfate, borates such as aluminum borate and zinc borate, titanates such as potassium titanate, metal oxides such as zinc oxide and titanium oxide and carbides such as carbon black.

The fine inorganic particles can either be porous or nonporous, and shapes thereof can either definite shapes such as a polygonal shape, a needle-like shape, a spherical shape, a cubic shape, a spindle shape, a plate-like shape and the like or indefinite shapes, but are not particularly limited. These particles can be used each independently or two or more of them can be used in combination with each other. Among them, calcium carbonate fine particles or silicon dioxide fine particles are preferable for the reason that the adsorbed amount of N,N-dimethylformamide is large and micropores can be formed easily. Calcium carbonate fine particles or silicon dioxide fine particles wherein the surfaces are hydrophobic-treated are more preferable.

Examples of calcium carbonate fine particles include heavy calcium carbonate obtained by grinding natural raw materials such as limestone, precipitated calcium carbonate produced by a chemical technique such as a carbon dioxide reaction method and a soluble salt reaction method and their aggregates. Furthermore, their hydrophobized substances wherein the surface is treated with a silane coupling agent or the like and hydrophobic groups are introduced or their hydrophobized substances wherein the surface is treated with a fatty acid or the like and is coated with a hydrophobic membrane can be used more preferably in terms of waterproofing properties.

Examples of the silicon dioxide fine particles include a product produced by a dry method such as a combustion method and an arc method, a product produced by a wet method such as a precipitation method and a gel method, and their aggregates. Furthermore, their hydrophobized substances wherein the surface is treated with a silane coupling agent or the like and hydrophobic groups are introduced can be used more preferably in terms of waterproofing properties.

The particle diameter of the fine inorganic particles is preferably 0.01-2 μm, more preferably 0.15-2 μm as an average particle diameter. Though it would be desirable that the particle diameter is small, particles having an average particle diameter of less than 0.01 μm are too expensive and may cause the increase of costs. When the average particle diameter is more than 2 μm, pores having a large pore diameter may be formed and sufficient waterproofing properties may not be achieved.

Though the content of fine inorganic particles can not be flatly defined because it varies depending on the variety of fine inorganic particles, it is generally required that it contains 5-75% by weight based on the total solid content, which is corresponding to approximately 5-300% by weight based on the amount of the synthetic polymer. When the content is less than 5% by weight, sufficient moisture permeability may not be achieved. When the content is more than 75% by weight, strength, in particular tensile strength, of the microporous layer thus obtained may be deteriorated and sufficient waterproofing properties may not be achieved.

In the case of using calcium carbonate fine particles as the fine inorganic particles, the content thereof is preferably 10-50% by weight based on the total solid content, which is corresponding to approximately 11-100% by weight based on the amount of the synthetic polymer, more preferably 15-45% by weight based on the total solid content, which is corresponding to approximately 18-82% by weight based on the amount of the synthetic polymer.

In the case of using silicon dioxide fine particles as the fine inorganic particles, the content thereof is preferably 10-40% by weight based on the total solid content, which is corresponding to approximately 11-67% by weight based on the amount of the synthetic polymer, more preferably 15-35% by weight based on the total solid content, which is corresponding to approximately 18-54% by weight based on the amount of the synthetic polymer.

The synthetic polymer solution can comprise other components as long as the effect of the present invention is not ruined. Examples of such optional components include pigment, cross-linking agents, catalysts, antioxidants, ultraviolet absorbents, surfactants, water repellent agents and antibacterial agents and the like.

Examples of methods for applying the synthetic polymer solution to the fibrous fabric include methods using a floating knife coater, a roll-on knife coater, a comma coater, a reverse coater, a rip coater, a roll coater, a die coater and the like. Among them, it is preferable to use a roll-on knife coater or a comma coater, for the reason that the synthetic polymer solution can be applied stably with the uniform thickness.

The amount of coating of the synthetic polymer solution is preferably 5-70 g/m$^2$, more preferably 10-40 g/m$^2$ as a solid content. By arranging the coating amount in this range, a microporous layer having the thickness of preferably 5-100 μm, more preferably 10-80 μm can be formed.

(2) Contact with Gas Phase

Subsequently, the synthetic polymer solution applied on the fibrous fabric is brought into contact with a gas phase in which water fog having an average particle diameter of 1-30 μm are uniformly dispersed.

Here, the gas phase in which water fog are uniformly dispersed means that an atmosphere wherein water ($H_2O$) that is liquid has become fine drops to disperse uniformly in the air, which is different from an atmosphere wherein water has become gas that is vapor to disperse in the air. Such a gas phase is also expressed as "mist" in many cases. In the gas phase wherein water fog are dispersed uniformly, water fog are vaporized to make the gas phase in the state of vapor saturation, and further, water fog which cannot be vaporized are in the state of dispersing in the gas phase. As a result, said gas phase can retain a large amount of water which exceeds the vapor saturation state.

The average particle diameter of water fog dispersed in the gas phase is required to be 1-30 μm, preferably 1-20 μm. It would be difficult to produce water fog having an average particle diameter of less than 1 μm in the preferable temperature range described below. When the average particle diameter is more than 30 μm, waterdrop traces might be left on the surface of the semi-coagulation layer, which may cause deterioration of quality in the moisture-permeable waterproof fabric thus obtained.

The average particle diameter of water fog dispersed in the gas phase can be measured using a particle size distribution measuring apparatus applying the principle of laser diffractometry. The measurement method of a particle size distribution applying the principle of laser diffractometry is an application of an intensity pattern of scattering light which changes depending on particle diameters at the time of applying light to the particles.

The above-mentioned gas phase can be prepared by using an apparatus which can convert water to atomized particles to spray. Examples of such apparatuses include a water spray humidifier of ultrasonic-type, two-fluid atomizer-type, centrifugal-type or the like. Among them, it is preferable to use an ultrasonic-type humidifier which enables to produce water fog having a small particle size by ultrasonic vibration.

In order to adjust the size of water fog dispersed in the gas phase to the desired average particle diameter, the variety of water spray humidifiers and spray conditions can be adjusted. For example, in the case of producing water fog having the particle diameter of 1-10 μm, water fog having a small particle size can be supplied stably by using an ultrasonic-type humidifier. In the case of producing water fog having the particle diameter of 10-30 μm, the particle size of water fog can be adjusted by using a two-fluid atomizer and varying the supplied amount of water and the pressure of pressurized air. Water fog having the particle diameter of 10-30 μm can also be produced by using a centrifugal-type humidifier wherein number of rotations of a rotating plate to scatter water centrifugally can be adjusted.

The temperature of said gas phase is preferably 5-50° C., more preferably 5-30° C. When the temperature is lower than 5° C., the saturated vapor pressure may be low and it may not be possible to retain a sufficient amount of water for making the synthetic polymer semi-coagulation. In addition, coagulation of water may occur and waterdrops of a large size may adhere on the surface of the synthetic polymer solution whereby waterdrop traces may be left, which may cause deterioration of quality in the moisture-permeable waterproof fabric thus obtained. When the temperature is higher than 50° C., the amount of vaporization of the polar organic solvent contained in the synthetic polymer solution may be large and coagulation on the surface of the synthetic polymer solution may be nonuniform, which may cause uneven in performances such as moisture permeability and waterproofing properties.

According to the present invention, the fibrous fabric wherein the synthetic polymer solution is applied is brought into contact with the above-mentioned gas phase, and thereby water fog dispersed uniformly in the gas phase is adhered uniformly and rapidly on the entire surface, that is one surface contacted with the gas phase, of the synthetic polymer solution, whereby coagulation of the synthetic polymer begins on the surface of the synthetic polymer solution.

Subsequently, on the surface of the synthetic polymer solution, a layer wherein coagulation is incomplete and in the state of progressing is formed within a few moments. At this time, the inside of the synthetic polymer solution, that is a part not being contacted with the gas phase, is thought to be hardly coagulated at all. According to the present invention, such a state of the synthetic polymer or the synthetic polymer solution as described is called as "semi-coagulation" and the layer formed on the surface of the synthetic polymer solution wherein coagulation is in the state of progressing is called as "a semi-coagulation layer".

After that, said fibrous fabric wherein the synthetic polymer solution is applied is immersed into water. At this time, penetration of water into the inside of the synthetic polymer solution and flowing out of the polar organic solvent contained in the synthetic polymer solution into water are suppressed by a semi-coagulation layer formed on the surface of the synthetic polymer solution. Therefore, coagulation rate of the synthetic polymer would become slow, which makes it possible to form a microporous layer which has a number of micropores having a small particle size.

Using a water-vapor atmosphere (or a gas phase wherein water is dispersed only in the state of gas or vapor) in place of the above-mentioned gas phase is not preferable for the reason that it has limitations in the retaining amount of water and it takes long time to semi-coagulate the synthetic polymer, which may cause deterioration of productivity.

Though the amount of water fog to be adhered to the surface of the synthetic polymer solution can not be flatly defined since it varies depending on the composition of the synthetic polymer solution, it is preferably 0.15-20 $g/m^2$, more preferably 0.25-10 $g/m^2$, most preferably 0.25-5 $g/m^2$.

When the amount of water fog is less than 0.15 $g/m^2$, the semi-coagulation layer may not be formed. When the amount of water fog is more than 20 $g/m^2$, water flow traces of waterdrops may be generated on the surface of the semi-coagulation layer and/or the polar organic solvent contained in the synthetic polymer solution may be leached out to the surface to generate dot-like traces, which may cause deterioration of quality in the moisture-permeable waterproof fabric thus obtained. In addition, the surface state of the synthetic polymer solution may become a complete solid passing over the state of a semi-coagulation, whereby, at the time of immersing the fabric in water at the next process, penetration of water into the inside of the synthetic polymer solution may be completely blocked and/or the surface solid layer may be peeled off to generate resin residues.

Methods for contacting the fibrous fabric wherein the synthetic polymer solution is applied with the gas phase in which water fog having an average particle diameter of 1-30 μm are uniformly dispersed are not particularly limited as long as water fog dispersed uniformly in said gas phase can be adhered uniformly to the entire surface of the synthetic polymer solution rapidly. Examples of such methods include a method of exposing the fibrous fabric wherein the synthetic polymer solution is applied to said gas phase which is an atmosphere wherein water fog having an average particle diameter of 1-30 μm are uniformly dispersed and a method of spraying said gas phase directly toward the synthetic polymer solution applied on the fibrous fabric.

Exposure to said gas phase can be carried out, for example, by transporting the above-mentioned fibrous fabric with the synthetic polymer solution applied continuously through an apparatus for exposure wherein the inside is adjusted to the atmosphere satisfying the prescribed conditions. In this case, adjustment of the adhered amount of water fog can be carried out by adjusting the time the fabric stays in the apparatus for exposure. More precisely, adjustment is carried out by varying the passing speed of the fibrous fabric passing through in the apparatus for exposure. Furthermore, since the moisture condition in the apparatus for exposure would change depending on the apparatus volume and the spray amount of a water spray humidifier, it is preferable to adjust the spray amount of said water spray humidifier in accordance with the apparatus volume so that water fog can be suspended stably in the apparatus.

The exposure time of the fibrous fabric with the synthetic polymer solution applied into said gas phase is preferably 1-60 seconds, more preferably 1-30 seconds. By adjusting the exposure time to this range, the amount of water fog to be adhered to the surface of the synthetic polymer solution can be adjusted to the above-mentioned range.

Regarding the method of exposure to the gas phase, the amount of water fog adhered to the surface of the synthetic polymer solution can be calculated by weight change of a filter paper after the adherence of water fog byway of transporting a fabric in an apparatus for exposure in the state that the filter paper is put on the surface to be actually treated of said fabric.

As mentioned above, in addition, it is also possible to semi-coagulate the synthetic polymer by spraying the above-mentioned gas phase in which water fog having an average particle diameter of 1-30 μm are uniformly dispersed onto the fibrous fabric with the synthetic polymer solution applied, more precisely, onto the surface of the synthetic polymer solution that is applied on the fibrous fabric, in place of the method of exposing the fibrous fabric with the synthetic polymer solution applied into said gas phase, according to the present invention.

In this case, by using a similar water-spray humidifier as used for adjusting the atmosphere of the inside of the apparatus for exposure, the above-mentioned gas phase sprayed out from said water-spray humidifier can be applied directly onto the surface of the synthetic polymer solution According to the above method, the necessary amount of water fog for semi-coagulating the synthetic polymer, i.e. preferably 0.15-20 $g/m^2$, more preferably 0.15-10 $g/m^2$, most preferably 0.25-5 $g/m^2$, can be adhered to the surface of the synthetic polymer solution in a shorter time compared with the method of exposing into said gas phase, whereby the synthetic polymer solution can be semi-coagulated in a shorter time, and therefore it is excellent in productivity.

In the method of spraying said gas phase directly onto the surface of the synthetic polymer solution, the amount of water fog can be adjusted by adjusting the spray amount from the water-spray humidifier, the distance from the surface of the synthetic polymer solution and the time of spraying. For example, the desired amount of water fog can be adhered onto the surface of the synthetic polymer solution by using a humidifier which can spray 0.1-5.0 kg of water fog per hour and by spraying said gas phase from the distance of 2-50 cm from the surface of the synthetic polymer solution for 1-15 seconds.

(3) Immersing into Water

Subsequently, the fibrous fabric wherein the synthetic polymer solution is applied, wherein a semi-coagulation layer is formed on the surface thereof, is immersed into water. In this process, water is penetrated into the inside of the synthetic polymer solution, and at the same time, the polar organic solvent contained in the synthetic polymer solution is replaced with water almost entirely, whereby coagulation of the synthetic polymer is completed. The semi-coagulation layer in this process, whose function effects are already described above, also becomes a completely coagulated layer by immersing in water.

Regarding the coagulation liquid, only water can be used and the presence of other components is not required. In the actual scene of manufacturing; however, the fibrous fabric wherein the synthetic polymer solution is applied is passed continuously through water (or the coagulation liquid), whereby the polar organic solvent is accumulated in water (or the coagulation liquid) increasingly. The present invention does not exclude the presence of a polar organic solvent in water (or the coagulation liquid) like this.

The temperature of coagulation liquid is preferably 0-70° C. When the temperature is higher than 70° C., coagulation of the synthetic polymer may be nonuniform, which may cause uneven in performances such as moisture permeability and waterproofing properties. In terms of adjusting the pore diameter and the number of micropores formed in the resin film to the desired range, it is more preferable that the temperature of coagulation liquid is 10-50° C.

The immersing time is preferably from 30 seconds to 10 minutes, more preferably 1-5 minutes. When the immersing time is shorter than 30 seconds, coagulation of the synthetic polymer may be incomplete, whereby sufficient moisture permeability and waterproofing properties may not be achieved. When the immersing time is longer than 10 minutes, deterioration of productivity may occur.

Subsequently, the fabric is subjected to washing treatment in hot water of 30-80° C. for 3-15 minutes to remove residual polar organic solvent, and then is subjected to heat treatment at 50-150° C. for 1-10 minutes for drying. In this way, a microporous layer of a substantially single-layer structure composed of a synthetic polymer is formed on a fibrous fabric, whereby the moisture-permeable waterproof fabric of the present invention can be obtained.

The moisture-permeable waterproof fabric thus obtained can be subjected to water repellent finishing as aftertreatment, whereby waterproofing properties will be more improved. Examples of water-repellent agents to be used for water repellent finishing include a paraffin-base water-repellent agent, a silicone-base water-repellent agent and a fluorine-based water-repellent agent. Among them, a fluorine-based water-repellent agent is preferable in terms of enabling to give high water-repellent properties. Water-repellent finishing can be carried out according to common procedures such as a padding method and a spray method.

Furthermore, as long as moisture permeability is not ruined, a nonporous film can be layered on the microporous layer.

3. Process for Producing Moisture-Permeable Waterproof Fabric (Laminating Method)

As one example of the process for producing the moisture-permeable waterproof fabric, a coating method wherein the synthetic polymer solution is applied directly on the fibrous fabric to form a film thereon has been described as above. The present invention, however, should not be particularly limited to the above method, that is, it can also be produced by a laminating method wherein a microporous layer film formed separately is laminated with a fibrous fabric.

That is, the moisture-permeable waterproof fabric of the present invention can be produced by applying a synthetic polymer solution comprising a synthetic polymer consisting mainly of a polyurethane resin, 5-75% by weight of fine inorganic particles based on the total solid content, and a polar organic solvent, to a releasable base material, then bringing said synthetic polymer solution into contact with a gas phase in which water fog having an average particle diameter of 1-30 μm is uniformly dispersed to make the synthetic polymer semi-coagulation, and subsequently, laminating a microporous layer film obtained by immersing said releasable base material wherein said synthetic polymer solution is applied in water to completely coagulate with one surface of a fibrous fabric via an adhesive.

The releasable base material to be used in the present invention is not particular limited. Examples thereof include a film consisting of a resin having releasability from the synthetic polymer such as a polyolefin resin and a silicone resin (hereinafter "a release agent") itself and a laminate such as a release paper, release fabric and a release film wherein a release layer consisting of a release agent is layered on a base material such as a paper, a fabric and a film. Among them, in terms of releasability, it is preferable to use a polyolefin film or a release film wherein a release layer consisting of polyolefin is layered on a polyester film. The releasable base material can have concave patterns. By using such a releasable base material, a microporous layer film having concave patterns on the surface thereof can be formed, whereby blocking of films with each other can be prevented and a moisture-permeable waterproof fabric excellent in texture can be obtained.

In the laminating method of the present invention, a synthetic polymer solution comprising a synthetic polymer consisting mainly of a polyurethane resin, 5-75% by weight of fine inorganic particles based on the total solid content and a polar organic solvent is applied to the releasable base material. The synthetic polymer solution to be used for applying here is same as that used in the above-mentioned coating method. As for a method for applying to the releasable base material, the same method as that used for coating the synthetic polymer solution onto the fibrous fabric in the coating method can be used.

The releasable base material wherein the synthetic polymer solution is applied is brought into contact with a gas phase, in the same manner as the case of the fibrous fabric wherein the synthetic polymer solution is applied using a coating method, to make the synthetic polymer semi-coagulation. And subsequently, said releasable base material to which said synthetic polymer solution is applied is immersed in water to completely coagulate.

On the releasable base material thus obtained is formed a microporous layer of a substantially single-layered structure consisting of the synthetic polymer.

Then, the microporous layer film is obtained by peeling off the releasable base material from the laminate of the releasable base material and the microporous layer film which is obtained in the above way. The microporous layer film thus obtained is then laminated with one surface of a fibrous fabric via an adhesive.

The adhesives to be used for laminating the microporous layer film with a fibrous fabric are not particularly limited, and ones of water-based, organic solvent-based, hot-melt type or the like can be used. The ingredients are not particularly limited, and they can be a polyurethane resin, an acrylic resin or the like. Among them, it is preferable to use an adhesive comprising a polyurethane resin in terms of flexibility. In addition, it is preferable to use an adhesive having moisture permeability in order to obtain a moisture-permeable waterproof fabric having high moisture permeability.

Regarding adhesion of the microporous layer film with a fibrous fabric, whole-surface adhesion can be carried out in the case of using an adhesive having moisture permeability.

However, nonwhole-surface adhesion such as formed of dot, line, mesh or the like is preferable in the case of using an adhesive not having moisture permeability and even in the case of using an adhesive having moisture permeability. The adhesive can be applied either to the microporous layer film or the fibrous fabric.

Examples of the coating methods of adhesives include methods using a knife coater, a comma coater, a gravure coater, a rotary screen, a fiat screen or the like. In particular, it is preferable to use a gravure coater in the case of nonwhole-surface adhesion.

The coating amount of adhesives is preferably 1-30 g/m$^2$, more preferably 5-20 g/m$^2$ based on the solid content. When the coating amount is less than 1 g/m$^2$, sufficient adhesive strength may not be achieved. When the coating amount is more than 30 g/m$^2$, sufficient moisture permeability may not be achieved, or the texture may become hard.

Other conditions are same as in the case of using the coating method.

EXAMPLES

The present invention will be described in more detail below referring to Examples and Comparative Examples, which are not intended to limit the scope of the present invention.

Measurements of physical properties and evaluations of the moisture-permeable waterproof fabric were carried out by the following methods:

(1) Coagulation Value of Polyurethane Resins

The polyurethane resins were diluted by N,N-dimethylformamide (DMF) up to the solid content concentration of 1% by weight. After approximately 30 g of the diluted solution was weighed and extracted, a water-DMF mixture of water/DMF=40/60 (weight ratio) that was a nonsolvent was dropped into the solution as stirring by a magnetic stirrer while keeping the solution temperature at 30-30.5° C. The middle point between the starting point of becoming turbid and the ending point thereof observed by the naked eye was determined to be a dropped amount of the nonsolvent.

This process was repeated three times to obtain an average value of the dropped amount, and using the average value, a coagulation value was calculated from the following mathematical formula, wherein, in the following mathematical formula, "a" represents the amount (g) of the resin solution having the solid content concentration of 1% by weight, "b" represents an amount (g) derived from "the dropped amount (mL)×0.985".

Coagulation Value(% by weight)={0.4$b$/($a+b$)}×100   [Mathematical Formula 1]

(2) 100% Extensional Stress of Polyurethane Resin

The polyurethane resin solution was coated onto a release paper, manufactured by Lintec Corporation, the trade name "EV-130TPD", using a comma coater so as to form a nonporous film having a thickness of 20 μm and was subjected to drying.

Subsequently, the release paper was peeled off and the nonporous film thus obtained was cut to obtain a test piece having the width of 25 mm and the length of 100 mm. The test piece was fixed on a tensile tester, manufactured by Shimadzu Corporation, trade name "Autograph AG-IS type", with a cramp clearance of 50 mm. The test piece was extended at a tension rate of 150 mm/minutes and a stress value F (N) at the time that the stroke distance became 50 mm was measured, and thus 100% extensional stress was calculated by the following mathematical formula:

100% Extensional Stress(MPa)= $F$/(25×0.020)   [Mathematical Formula 1]

(3) Tensile Strength of Microporous layer film

The synthetic polymer solution having the same composition as in Examples was coated on a release paper, manufactured by Lintec Corporation, the trade name "EV-130TPD", using a knife over roll coater so as to form a microporous layer film having the same thickness as in Examples, and subsequently, after making the synthetic polymer semi-coagulation and then complete coagulation under the same conditions as in Examples, it was subjected to drying.

Subsequently, the release paper was peeled off and the microporous layer film thus obtained was cut to obtain a test piece having the width of 25 mm and the length of 100 mm. The test piece was fixed on a tensile tester, manufactured by Shimadzu Corporation, trade name "Autograph AG-IS type", with a cramp clearance of 50 mm. The test piece was extended at a tension rate of 150 mm/minutes and the maximum load at the time that the test piece was fractured.

(4) State of Microporous Layer

A scanning electron microscope, manufactured by Hitachi High-Technologies Corporation, trade name "S-3000N", was used to take a picture of vertical section at a magnification of 300-5000, and thus the state of the microporous layer was observed. The thickness of the microporous layer was measured by a picture of vertical section at a magnification of 300-1000. The number of micropores having a pore diameter of 0.1-5 μm was counted by a picture of vertical section at a magnification of 1000-5000. The number of pores having a pore diameter of more than 5 μm was counted by a picture of vertical section at a magnification of 300-1000. The area ratio of pores having a pore diameter of more than 5 μm was calculated by entering the date of a picture of vertical section at a magnification of 300-1000 into a personal computer by a scanner, painting the pores having a pore diameter of more than 5 μm entirely in white, digitalizing the colors of the area of said pores and the other area corresponding to the area wherein, according to the present invention, micropores having a pore diameter of 0.1-5 μm are present into white and black, and integrating the white dot areas to aggregate. In addition, the pore diameter of pores having the maximum pore diameter present in the microporous layer (the maximum pore diameter: μm) and the ratio of the pore diameter based on the thickness of the microporous layer (%) were calculated in the same manner using the picture of vertical section (5) Degree of Moisture Permeability of Moisture-Permeable Waterproof Fabric The degree of moisture permeability of the moisture-permeable waterproof fabric was measured in accordance with JIS L-1099 A-1 method (the calcium chloride method) or JIS L-1099 B-1 method (the potassium acetate method).

(6) Water Pressure Resistance of Moisture-Permeable Waterproof Fabric

Water pressure resistance of the moisture-permeable waterproof fabric was measured in accordance with JIS L-1092 B method (a high water pressure method). In this method, water pressure measured at the time that water was leaked out from 10 points in the reverse side of the test piece was recorded as "water pressure resistance of 10-point leak", water pressure measured at the time that water was leaked out from 50-100 points in the reverse side of the test piece was recorded as "water pressure resistance of whole-surface leak", in combination with water pressure resistance measured by JIS L-1092 B method (a high water pressure method) (herein after, "water pressure resistance of 3-point leak").

(7) Average Particle Diameter of Water fog in Gas phase

The average particle diameter of water fog in the gas phase was measured by, using a measuring apparatus for a particle size distribution employing the principle of a laser diffraction, manufactured by SYSMEX CORPORATION, the trade name "spraytec", and making the gas phase in an apparatus for exposure wherein water fog were dispersed fluid in the measuring apparatus.

(8) Amount of Water fog Adhered on Synthetic Polymer Solution

A piece of filter paper having the size of 30 cm×30 cm whose weight had been measured in advance was pasted on one side of a fibrous fabric and was subjected to pass through the inside of the apparatus for mist exposure at the same passing speed of 10 m/min as in Examples so that water fog became adherent thereto. The weight of the filter paper immediately after adhesion of water fog was measured and the adhered amount of water fog per unit area was calculated. This measurement was carried out for three times and the average value was defined to be the amount of water fog adhered thereto.

Example 1

A gray fabric of a flat-woven textile (fibrous fabric) having a warp density of 120 yarns/2.54 cm and a weft density of 90 yarns/2.54 cm was prepared by weaving using 6-nylon multifilament yarns of 80 dtex/34 filaments as a warp yarn and 6-nylon multifilament yarns of 80 dtex/24 filaments as a weft yarn, and was subjected to refining and dyeing treatments in the conventional manner.

Subsequently, said fibrous fabric was immersed in an aqueous dispersion liquid containing 5% by weight of a fluorine-based water repellent agent (water-based), manufactured by ASAHI GLASS CO., LTD., the trade name "AsahiGuard AG7000", then was squeezed by a mangle with the squeezing ratio of 40%, and was subjected to heat treatment at 100° C. for 3 minutes for drying, and then was subjected to heat treatment at 160° C. for 1 minute for curing to conduct water-repellent finishing.

Subsequently, using a calendering equipment with a gloss calender roll, it was subjected to calendering under the conditions of the temperature of 170° C., the pressure of 35 kg/cm$^2$ and the rate of 25 m/min. The fibrous fabric thus obtained having the thickness of approximately 0.12 mm was used as a test fibrous fabric.

On the calendered surface of said test fibrous fabric, the synthetic polymer solution having the composition showed in Formulation 1 was coated by using a knife over roll coater so that the coating amount became 100 g/m$^2$, which was approximately 32 g/m$^2$ as a solid content, in a wet condition. Thereafter, the fibrous fabric wherein the synthetic polymer solution is applied was subjected to passing through the inside of an apparatus for exposure, manufactured by SEIREN ELECTRONICS Co., Ltd., having the inner volume of approximately 5.0 m$^3$, equipped with a water spray humidifier, manufactured by ULAN Co., Ltd., the trade name "FT-161DH", under the conditions of the water-spraying amount of 8.0 kg/hour and the passing speed of 10 m/min to expose the fibrous fabric wherein the synthetic polymer solution is applied to a gas phase at 20±5° C., wherein water fog having an average particle diameter of 7 μm were uniformly dispersed, for 30 seconds to become semi-coagulation. At this time, the amount of water fog adhered on the surface of the synthetic polymer solution was approximately 2 g/m$^2$.

<Formulation 1>

1) 100 parts by weight of the trade name "RESAMINE CU-4555", which is a polyester-based polyurethane resin solution comprising approximately 27% by weight of a polyester-based polyurethane resin having 100% extension stress of 5.5 MPa, a coagulation value of 9.8% by weight and the molecular weight of about 100,000 in N,N-dimethylformamide, manufactured by Dainichiseika Color & Chemicals Mfg., Co., Ltd.

2) 70 parts by weight of the trade name "MY 3657", which is a calcium carbonate fine particle-dispersion liquid comprising approximately 38% by weight of calcium carbonate fine particles having an average particle diameter of about 1 μm that are hydrophobized with a fatty acid and approximately 16% by weight of a polyurethane resin for dispersion in N,N-dimethylformamide, manufactured by Dainichiseika Color & Chemicals Mfg., Co., Ltd.

3) 1 part by weight of the trade name "X-100 cross-linking agent", which is an isocyanate-based cross-linking agent, manufactured by Dainichiseika Color & Chemicals Mfg., Co., Ltd.

4) 35 parts by weight of N,N-dimethylformamide

In the synthetic polymer solution having the composition of Formulation 1, the ratio of the total amount of polyurethane resins combined of the polyester-based polyurethane resin with the polyurethane resin for dispersion contained in the calcium carbonate fine particle-dispersion liquid was approximately 19% by weight based upon the total weight of the solution. The ratio of the polyester-based polyurethane resin was approximately 71% by weight based upon the total weight of polyurethane resins. The ratio of the calcium carbonate fine particles based upon the total solid content was approximately 40% by weight, wherein the ratio thereof based upon the total weight of the polyurethane resins was approximately 70% by weight.

Subsequently, the fibrous fabric wherein the synthetic polymer solution is applied was immersed in a water of 15° C. for 1.5 minutes to be completely coagulated. Then, after washing in hot water at 50° C. for 5 minutes, it was subjected to heat treatment at 150° C. for 2 minutes for drying. Thus, a moisture-permeable waterproof fabric for Example 1 was obtained.

Example 2

A moisture-permeable waterproof fabric for Example 2 was obtained in the same manner as in Example 1, except for changing the mixing amount of MY 3657 to 19 parts by weight in the above synthetic polymer solution of Formulation 1.

In said synthetic polymer solution, the ratio of the total amount of polyurethane resins combined of the polyester-based polyurethane resin with the polyurethane resin for dispersion contained in the calcium carbonate fine particle-dispersion liquid was approximately 19% by weight based upon the total weight of the solution. The ratio of the polyester-based polyurethane resin was approximately 90% by weight based upon the total weight of polyurethane resins. The ratio of the calcium carbonate fine particles based upon the total solid content was approximately 19% by weight, wherein the ratio thereof based upon the total weight of the polyurethane resins was approximately 24% by weight. The coating amount as a solid content was approximately 25 g/m$^2$.

Example 3

A moisture-permeable waterproof fabric for Example 3 was obtained in the same manner as in Example 1, except for changing the mixing amount of MY 3657 to 130 parts by weight in the above synthetic polymer solution of Formulation 1.

In said synthetic polymer solution, the ratio of the total amount of polyurethane resins combined of the polyester-based polyurethane resin with the polyurethane resin for dispersion contained in the calcium carbonate fine particle-dispersion liquid was approximately 18% by weight based upon the total weight of the solution. The ratio of the polyester-based polyurethane resin was approximately 56% by weight based upon the total weight of polyurethane resins. The ratio of the calcium carbonate fine particles based upon the total solid content was approximately 50% by weight, wherein the ratio thereof based upon the total weight of the polyurethane resins was approximately 103% by weight. The coating amount as a solid content was approximately 37 g/m².

Example 4

A moisture-permeable waterproof fabric for Example 4 was obtained in the same manner as in Example 1, except for using the synthetic polymer solution of Formulation 2 below, in place of the synthetic polymer solution of Formulation 1.
<Formulation 2>
1) 100 parts by weight of the trade name "RESAMINE CU-4555", which is a polyester-based polyurethane resin solution comprising approximately 27% by weight of a polyester-based polyurethane resin having 100% extension stress of 5.5 MPa, a coagulation value of 9.8% by weight and the molecular weight of about 100,000 in N,N-dimethylformamide, manufactured by Dainichiseika Color & Chemicals Mfg., Co., Ltd.
2) 20 parts by weight of the trade name "Vigot 15", which are calcium carbonate fine particles having an average particle diameter of about 0.15 μm that are hydrophobized with a fatty acid, manufactured by SHIRAISHI KOGYO KAISHA, LTD.
3) 1 part by weight of the trade name "X-100 cross-linking agent", which is an isocyanate-based cross-linking agent, manufactured by Dainichiseika Color & Chemicals Mfg., Co., Ltd.
4) 50 parts by weight of N,N-dimethylformamide In the synthetic polymer solution having the composition of Formulation 2, the ratio of the amount of the polyester-based polyurethane resin was approximately 16% by weight based upon the total weight of the solution. The ratio of the calcium carbonate fine particles based upon the total solid content was approximately 42% by weight, wherein the ratio thereof based upon the weight of the polyester-based polyurethane resin was approximately 74% by weight. The coating amount as a solid content was approximately 28 g/m².

Example 5

A moisture-permeable waterproof fabric for Example 5 was obtained in the same manner as in Example 1, except for using the synthetic polymer solution of Formulation 3 below, in place of the synthetic polymer solution of Formulation 1.
<Formulation 3>
1) 100 parts by weight of the trade name "RESAMINE CU-4555", which is a polyester-based polyurethane resin solution comprising approximately 27% by weight of a polyester-based polyurethane resin having 100% extension stress of 5.5 MPa, a coagulation value of 9.8% by weight and the molecular weight of about 100,000 in N,N-dimethylformamide, manufactured by Dainichiseika Color & Chemicals Mfg., Co., Ltd.
2) 20 parts by weight of the trade name "LITON A", which are calcium carbonate fine particles having an average particle diameter of about 2 μm that are hydrophobized with a modified fatty acid, manufactured by SHIRAISHI KOGYO KAISHA, LTD.
3) 1 part by weight of the trade name "X-100 cross-linking agent", which is an isocyanate-based cross-linking agent, manufactured by Dainichiseika Color & Chemicals Mfg., Co., Ltd.
4) 50 parts by weight of N,N-dimethylformamide In the synthetic polymer solution having the composition of Formulation 3, the ratio of the amount of the polyester-based polyurethane resin was approximately 16% by weight based upon the total weight of the solution. The ratio of the calcium carbonate fine particles based upon the total solid content was approximately 42% by weight, wherein the ratio thereof based upon the weight of the polyester-based polyurethane resin was approximately 74% by weight. The coating amount as a solid content was approximately 28 g/m².

Example 6

A moisture-permeable waterproof fabric for Example 6 was obtained in the same manner as in Example 1, except for conducting a process of spraying a gas phase at 20±5° C. wherein water fog having an average particle diameter of 7 μm were uniformly dispersed onto the surface of the synthetic polymer solution applied to said fibrous fabric for 5 seconds, whereby the amount of water fog adhered on the surface of the synthetic polymer solution was approximately 1.5 g/m², in place of the process of exposing the fibrous fabric wherein the synthetic polymer solution is applied to a gas phase at 20±5° C. wherein water fog having an average particle diameter of 7 μm were uniformly dispersed for 30 seconds.

Spraying was carried out using a water spray humidifier, manufactured by UCAN Co., Ltd., the trade name "FT-161DH", with the water-spraying amount of 8.0 kg/hour, from a point distant separated approximately 5 cm from the surface of the synthetic polymer solution.

Example 7

The moisture-permeable waterproof fabric obtained in Example 1 was immersed in a turpentine solution containing 5% by weight of a fluorine-based water repellent agent (organic solvent-based), manufactured by DIC Corporation, the trade name "DIC Guard NH-10", then it was squeezed by a mangle with the squeezing ratio of 20%, and was subjected to heat treatment at 120° C. for 3 minutes for drying, and then was subjected to heat treatment at 160° C. for 1 minute to be cured for a water-repellent finishing. Thus, a moisture-permeable waterproof fabric for Example 7 was obtained.

Comparative Example 1

A moisture-permeable waterproof fabric for Comparative Example 1 was obtained in the same manner as in Example 1, except for changing the mixing amount of MY 3657 to 3 parts by weight in the above synthetic polymer solution of Formulation 1.

In said synthetic polymer solution, the ratio of the total amount of polyurethane resins combined of the polyester-based polyurethane resin with the polyurethane resin for dispersion contained in the calcium carbonate fine particle-dispersion liquid was approximately 20% by weight based upon the total weight of the solution. The ratio of the polyester-based polyurethane resin was approximately 98% by weight based upon the total weight of polyurethane resins. The ratio of the calcium carbonate fine particles based upon the total solid content was approximately 4% by weight, wherein the ratio thereof based upon the total weight of the polyurethane resins was approximately 4% by weight. The coating amount as a solid content was approximately 21 g/m².

Comparative Example 2

A moisture-permeable waterproof fabric for Comparative Example 2 was obtained in the same manner as in Example 1, except for using the synthetic polymer solution of Formulation 4 in place of using the synthetic polymer solution of Formulation 1.

<Formulation 4>
1) 100 parts by weight of the trade name "RESAMINE CU-4555", which is a polyester-based polyurethane resin solution comprising approximately 27% by weight of a polyester-based polyurethane resin having 100% extension stress of 5.5 MPa, a coagulation value of 9.8% by weight and the molecular weight of about 100,000 in N,N-dimethylformamide, manufactured by Dainichiseika Color & Chemicals Mfg., Co., Ltd.
2) 100 parts by weight of the trade name "LITON BS-O", which are calcium carbonate fine particles having an average particle diameter of about 1 μm that are hydrophobized with a fatty acid and a modified fatty acid, manufactured by SHIRAISHI KOGYO KAISHA, LTD.
3) 1 part by weight of the trade name "X-100 cross-linking agent", which is an isocyanate-based cross-linking agent, manufactured by Dainichiseika Color & Chemicals Mfg., Co., Ltd.
4) 200 parts by weight of N,N-dimethylformamide In the synthetic polymer solution having the composition of Formulation 4, the ratio of the amount of the polyester-based polyurethane resin was approximately 7% by weight based upon the total weight of the solution. The ratio of the calcium carbonate fine particles based upon the total solid content was approximately 78% by weight, wherein the ratio thereof based upon the weight of the polyester-based polyurethane resin was approximately 370% by weight. The coating amount as a solid content was approximately 32 g/m².

Comparative Example 3

A moisture-permeable waterproof fabric for Comparative Example 3 was obtained in the same manner as in Example 1, except for omitting the process of exposing the fibrous fabric to a gas phase at 20±5° C. wherein water fog having an average particle diameter of 7 μm were uniformly dispersed for 30 seconds.

Comparative Example 4

A moisture-permeable waterproof fabric for Comparative Example 4 was obtained in the same manner as in Example 4, except for omitting the process of exposing the fibrous fabric to a gas phase at 20±5° C. wherein water fog having an average particle diameter of 7 μm were uniformly dispersed for 30 seconds.

Example 8

A moisture-permeable waterproof fabric for Example 8 was obtained in the same manner as in Example 1, except for using the synthetic polymer solution of Formulation 5 in place of using the synthetic polymer solution of Formulation 1.

<Formulation 5>
1) 100 parts by weight of the trade name "RESAMINE CU-4555", which is a polyester-based polyurethane resin solution comprising approximately 27% by weight of a polyester-based polyurethane resin having 100% extension stress of 5.5 MPa, a coagulation value of 9.8% by weight and the molecular weight of about 100,000 in N,N-dimethylformamide, manufactured by Dainichiseika Color & Chemicals Mfg., Co., Ltd.
2) 12 parts by weight of the trade name "Nipsil SS-50F", which are silicon dioxide fine particles having an average particle diameter of about 1.2 μm that are hydrophobized by introducing an alkyl group, manufactured by Tosoh Silica Corporation.
3) 1 part by weight of the trade name "X-100 cross-linking agent", which is an isocyanate-based cross-linking agent, manufactured by Dainichiseika Color & Chemicals Mfg., Co., Ltd.
4) 54 parts by weight of N,N-dimethylformamide In the synthetic polymer solution having the composition of Formulation 5, the ratio of the amount of the polyester-based polyurethane resin was approximately 16% by weight based upon the total weight of the solution. The ratio of the silicon dioxide fine particles based upon the total solid content was approximately 30% by weight, wherein the ratio thereof based upon the weight of the polyester-based polyurethane resin was approximately 44% by weight. The coating amount as a solid content was approximately 24 g/m².

Example 9

A moisture-permeable waterproof fabric for Example 9 was obtained in the same manner as in Example 8, except for changing the mixing amount of Nipsil SS-50F to 6 parts by weight and the mixing amount of N,N-dimethylformamide to 43 parts by weight in the above synthetic polymer solution of Formulation 5.

In the synthetic polymer solution, the ratio of the amount of the polyester-based polyurethane resin was approximately 18% by weight based upon the total weight of the solution. The ratio of the silicon dioxide fine particles based upon the total solid content was approximately 18% by weight, wherein the ratio thereof based upon the weight of the polyester-based polyurethane resin was approximately 22% by weight. The coating amount as a solid content was approximately 23 g/m²

Example 10

A moisture-permeable waterproof fabric for Example 10 was obtained in the same manner as in Example 8, except for changing the mixing amount of Nipsil SS-50F to 28 parts by weight and the mixing amount of N,N-dimethylformamide to 55 parts by weight in the above synthetic polymer solution of Formulation 5.

In the synthetic polymer solution, the ratio of the amount of the polyester-based polyurethane resin was approximately 15% by weight based upon the total weight of the solution. The ratio of the silicon dioxide fine particles based upon the total solid content was approximately 50% by weight, wherein the ratio thereof based upon the weight of the polyester-based polyurethane resin was approximately 104% by weight. The coating amount as a solid content was approximately 30 g/m²

Example 11

A moisture-permeable waterproof fabric for Example 11 was obtained in the same manner as in Example 8, except for using the synthetic polymer solution of Formulation 6 in place of using the synthetic polymer solution of Formulation 5.

<Formulation 6>
1) 100 parts by weight of the trade name "RESAMINE CU-4555", which is a polyester-based polyurethane resin solution comprising approximately 27% by weight of a polyester-based polyurethane resin having 100% extension stress of 5.5 MPa, a coagulation value of 9.8% by weight and the molecular weight of about 100,000 in N,N-dimethylformamide, manufactured by Dainichiseika Color & Chemicals Mfg., Co., Ltd.
2) 12 parts by weight of the trade name "AEROSIL R812S", which are silicon dioxide fine particles having an average particle diameter of about 0.007 μm that are hydrophobized by introducing a trimethylsilyl group, manufactured by Degussa Co., Ltd.
3) 1 part by weight of the trade name "X-100 cross-linking agent", which is an isocyanate-based cross-linking agent, manufactured by Dainichiseika Color & Chemicals Mfg., Co., Ltd.
4) 54 parts by weight of N,N-dimethylformamide In the synthetic polymer solution having the composition of Formulation 6, the ratio of the amount of the polyester-based polyurethane resin was approximately 16% by weight based upon the total weight of the solution. The ratio of the silicon dioxide fine particles based upon the total solid content was approximately 30% by weight, wherein the ratio thereof based upon the weight of the polyester-based polyurethane resin was approximately 44% by weight. The coating amount as a solid content was approximately 24 g/m².

Example 12

A moisture-permeable waterproof fabric for Example 12 was obtained in the same manner as in Example 8, except for using the synthetic polymer solution of Formulation 7 in place of using the synthetic polymer solution of Formulation 5.

<Formulation 7>
1) 100 parts by weight of the trade name "RESAMINE CU-4555", which is a polyester-based polyurethane resin solution comprising approximately 27% by weight of a polyester-based polyurethane resin having 100% extension stress of 5.5 MPa, a coagulation value of 9.8% by weight and the molecular weight of about 100,000 in N,N-dimethylformamide, manufactured by Dainichiseika Color & Chemicals Mfg., Co., Ltd.
2) 12 parts by weight of the trade name "AEROSIL R202", which are silicon dioxide fine particles having an average particle diameter of about 0.014 μm that are hydrophobized by dimethyl silicone oil, manufactured by Degussa Co., Ltd.
3) 1 part by weight of the trade name "X-100 cross-linking agent", which is an isocyanate-based cross-linking agent, manufactured by Dainichiseika Color & Chemicals Mfg., Co., Ltd.
4) 54 parts by weight of N,N-dimethylformamide In the synthetic polymer solution having the composition of Formulation 7, the ratio of the amount of the polyester-based polyurethane resin was approximately 16% by weight based upon the total weight of the solution. The ratio of the silicon dioxide fine particles based upon the total solid content was approximately 30% by weight, wherein the ratio thereof based upon the weight of the polyester-based polyurethane resin was approximately 44% by weight. The coating amount as a solid content was approximately 24 g/m².

Example 13

A moisture-permeable waterproof fabric for Example 13 was obtained in the same manner as in Example 8, except for using the synthetic polymer solution of Formulation 8 in place of using the synthetic polymer solution of Formulation 5.

<Formulation 8>
1) 100 parts by weight of the trade name "RESAMINE CU-4555", which is a polyester-based polyurethane resin solution comprising approximately 27% by weight of a polyester-based polyurethane resin having 100% extension stress of 5.5 MPa, a coagulation value of 9.8% by weight and the molecular weight of about 100,000 in N,N-dimethylformamide, manufactured by Dainichiseika Color & Chemicals Mfg., Co., Ltd.
2) 12 parts by weight of the trade name "Nipsil SS-50", which are silicon dioxide fine particles having an average particle diameter of about 1.5 μm that are hydrophobized by introducing an alkyl group, manufactured by Tosoh Silica Corporation.
3) 1 part by weight of the trade name "X-100 cross-linking agent", which is an isocyanate-based cross-linking agent, manufactured by Dainichiseika Color & Chemicals Mfg., Co., Ltd.
4) 54 parts by weight of N,N-dimethylformamide In the synthetic polymer solution having the composition of Formulation 8, the ratio of the amount of the polyester-based polyurethane resin was approximately 16% by weight based upon the total weight of the solution. The ratio of the silicon dioxide fine particles based upon the total solid content was approximately 30% by weight, wherein the ratio thereof based upon the weight of the polyester-based polyurethane resin was approximately 44% by weight. The coating amount as a solid content was approximately 24 g/m².

Example 14

A moisture-permeable waterproof fabric for Example 14 was obtained in the same manner as in Example 8, except for conducting a process of spraying a gas phase at 20±5° C. wherein water fog having an average particle diameter of 7 μm were uniformly dispersed onto the surface of the synthetic polymer solution applied on said fibrous fabric with for 5 seconds, whereby the amount of water fog adhered on the surface of the synthetic polymer solution was approximately 1.5 g/m², in place of the process of exposing the fibrous fabric wherein the synthetic polymer solution is applied to a gas phase at 20±5° C. wherein water fog having an average particle diameter of 7 μm were uniformly dispersed for 30 seconds.

Spraying was carried out using a water spray humidifier, manufactured by UCAN Co., Ltd., the trade name "FT-161DH", with the water-spraying amount of 8.0 L/hour, from a point distant separated approximately 5 cm from the surface of the synthetic polymer solution.

Example 15

The moisture-permeable waterproof fabric obtained in Example 8 was immersed in a turpentine solution containing 5% by weight of fluorine-based water repellent agent (organic solvent-based), manufactured by DIC Corporation, the trade name "DIC Guard NH-10", then it was squeezed by a mangle with the squeezing ratio of 20%, and was subjected to heat treatment at 120° C. for 3 minutes for drying, and then was subjected to heat treatment at 160° C. for 1 minute to be cured for a water-repellent finishing. Thus, a moisture-permeable waterproof fabric for Example 15 was obtained.

Comparative Example 5

A moisture-permeable waterproof fabric for Comparative Example 5 was obtained in the same manner as in Example 8, except for changing the mixing amount of Nipsil SS-50F to 1 part by weight and the mixing amount of N,N-dimethylformamide to 35 parts by weight in the above synthetic polymer solution of Formulation 5.

In the synthetic polymer solution, the ratio of the amount of the polyester-based polyurethane resin was approximately 20% by weight based upon the total weight of the solution. The ratio of the silicon dioxide fine particles based upon the total solid content was approximately 3% by weight, wherein the ratio thereof based upon the weight of the polyester-based polyurethane resin was approximately 4% by weight. The coating amount as a solid content was approximately 21 g/m²

Comparative Example 6

A moisture-permeable waterproof fabric for Comparative Example 6 was obtained in the same manner as in Example 8, except for changing the mixing amount of Nipsil SS-50F to 120 parts by weight and the mixing amount of N,N-dimethylformamide to 300 parts by weight in the above synthetic polymer solution of Formulation 5.

In the synthetic polymer solution, the ratio of the amount of the polyester-based polyurethane resin was approximately 5% by weight based upon the total weight of the solution. The ratio of the silicon dioxide fine particles based upon the total solid content was approximately 81% by weight, wherein the ratio thereof based upon the weight of the polyester-based polyurethane resin was approximately 444% by weight. The coating amount as a solid content was approximately 28 g/m²

Comparative Example 7

A moisture-permeable waterproof fabric for Comparative Example 7 was obtained in the same manner as in Example 8, except for omitting the process of exposing the fibrous fabric to a gas phase at 20±5° C. wherein water fog having an average particle diameter of 7 μm were uniformly dispersed for 30 seconds.

Comparative Example 8

A moisture-permeable waterproof fabric for Comparative Example 8 was obtained in the same manner as in Example 12, except for omitting the process of exposing the fibrous fabric to a gas phase at 20±5° C. wherein water fog having an average particle diameter of 7 μm were uniformly dispersed for 30 seconds.

The evaluation results for the moisture-permeable waterproof fabrics obtained by the above-mentioned Examples and Comparative Examples were shown in Table 1 which shows about Example 1-7 and Comparative Examples 1-4 relating to the cases of using calcium carbonate fine particles as inorganic fine particles, and in Table 2 which shows about Example 8-15 and Comparative Examples 5-8 relating to the cases of using silicon dioxide fine particles as inorganic fine particles.

According to the results of Comparative Examples 1, 3, 4, 5, 7 and 8 in the above-mentioned Tables, "the number of micropores having a pore diameter of 0.1-5 μm" was described as "-", which means that the number of micropores had not been counted for the reason that the microporous layer had a honeycomb skin core structure wherein cavities having a pore size of as much as 80% of the thickness of the microporous layer are formed.

Figure 2:
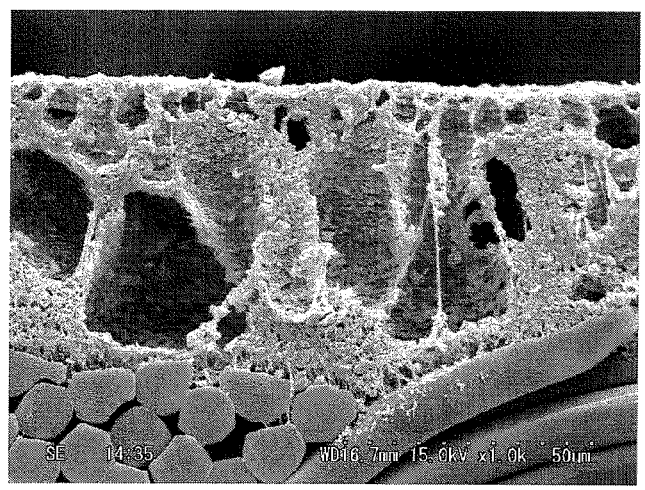
FIG. 2 shows an electron microscope photograph of a vertical cross-section of the moisture-permeable waterproof fabric of Comparative Example 3 of the present invention. Of said FIG. 2, (a) is an electron microscope photograph magnified 1000 times. Of said FIG. 2, (b) is an electron microscope photograph magnified 300 times.
Figure 2:
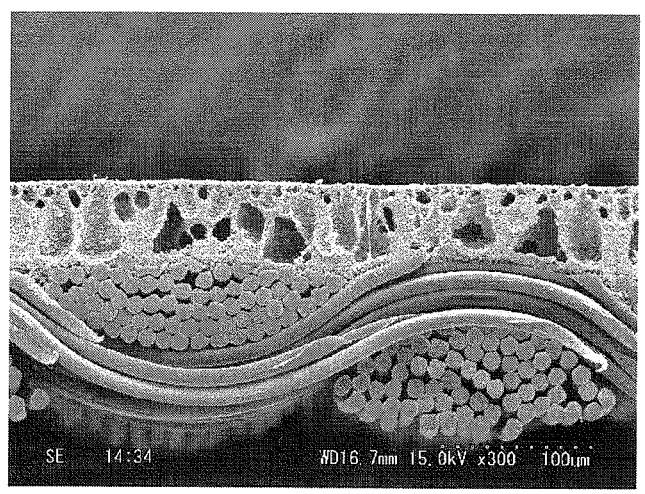
Figure 3:
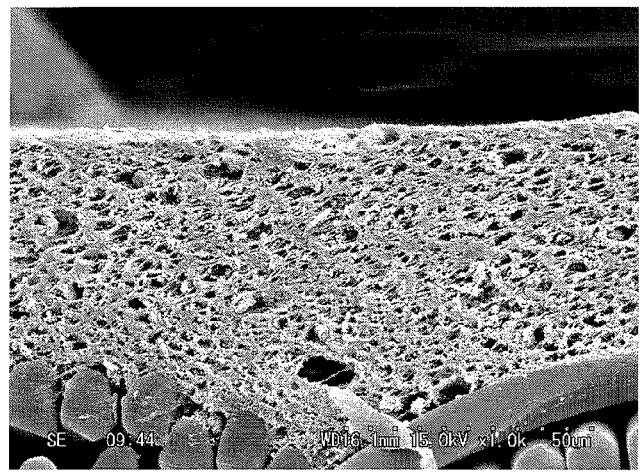
FIG. 3 shows an electron microscope photograph of a vertical cross-section of the moisture-permeable waterproof fabric of Example 8 of the present invention. Of said FIG. 3, (a) is an electron microscope photograph magnified 1000 times. Of said FIG. 3, (b) is an electron microscope photograph magnified 300 times.
Figure 3:
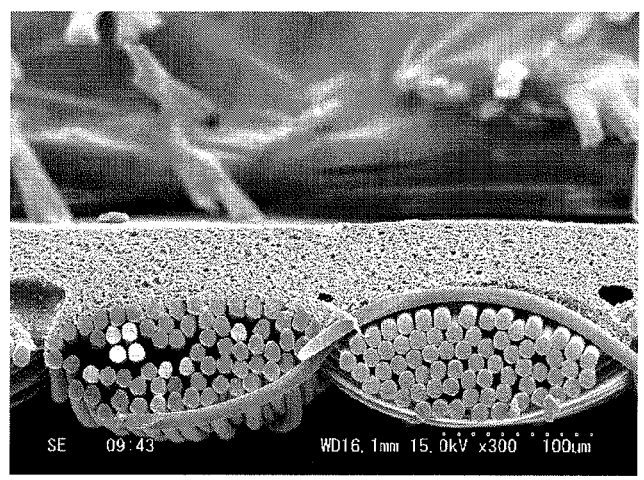
Figure 4:
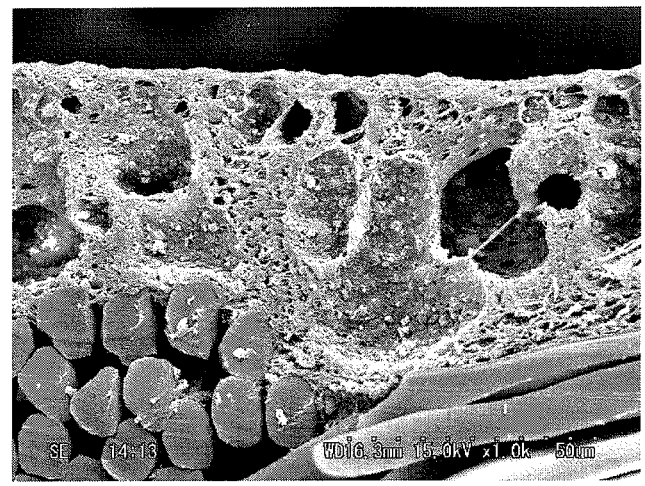
FIG. 4 shows an electron microscope photograph of a vertical cross-section of the moisture-permeable waterproof fabric of Comparative Example 7 of the present invention. Of said FIG. 4, (a) is an electron microscope photograph magnified 1000 times. Of said FIG. 4, (b) is an electron microscope photograph magnified 300 times.
Figure 4:
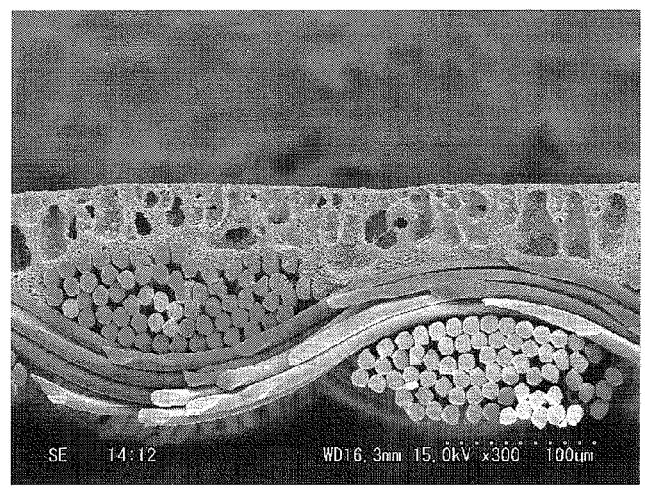

In addition, electron microscope photographs of a vertical cross-section of the moisture-permeable waterproof fabrics obtained in Example 1, Comparative Example 3, Example 8 and Comparative Example 7 were shown in FIG. 1, FIG. 2, FIG. 3 and FIG. 4 respectively. In each figure, (a) is an electron microscope photograph magnified 1000 times. In each figure, (b) is an electron microscope photograph magnified 300 times.

TABLE 1

|  |  | Examples | | | | | | |
|---|---|---|---|---|---|---|---|---|
|  |  | 1 | 2 | 3 | 4 | 5 | 6 | 7 |
| Calcium Carbonate Fine Particles | Average Particle Diameter [μm] | 1 | 1 | 1 | 0.15 | 2 | 1 | 1 |
|  | Rate based upon Total Solid Content [wt %] | 40 | 19 | 50 | 42 | 42 | 40 | 40 |
|  | Rate based upon Synthetic Polymer [wt %] | 70 | 24 | 103 | 74 | 74 | 70 | 70 |
| Exposed to Gas phase Water fog Being Dispersed | | Yes | Yes | Yes | Yes | Yes | (Spray) | Yes |
| Aftertreatment of Water Repellent Finishing | | No | No | No | No | No | No | Yes |
| Evaluations | Microporous layer | State | Single Layer | Single Layer | Single Layer | Single Layer | Single Layer | Single Layer | Single Layer |
|  |  | Thickness [μm] | 40 | 52 | 46 | 24 | 27 | 40 | 40 |
|  |  | Tensile Strength [MPa] | 7.5 | 15.5 | 6.5 | 7.8 | 7.9 | 7.5 | 7.5 |
|  |  | Number of Micropores Having Pore Diameter of 0.1-5 μm [number/mm²] | 72 × 10⁴ | 32 × 10⁴ | 82 × 10⁴ | 96 × 10⁴ | 88 × 10⁴ | 72 × 10⁴ | 72 × 10⁴ |
|  |  | Number of Pores Having Pore Diameter of >5 μm [number/mm²] | 130 | 510 | 310 | 80 | 120 | 190 | 110 |
|  |  | Area Ratio of Pores Having Pore Diameter of >5 μm [%] | 5 | 17 | 14 | 3 | 15 | 10 | 4 |

TABLE 1-continued

|  |  |  |  |  |  |  |  |  |
|---|---|---|---|---|---|---|---|---|
|  | Maximum Pore Diameter [μm] | 22 | 25 | 8 | 10 | 15 | 17 | 19 |
|  | Ratio Based Upon Film Thickness [%] | 55% | 48% | 17% | 42% | 56% | 43% | 48% |
| Moisture Permeability [g/m² · 24 hrs] | A-1 Method | 10400 | 7800 | 11000 | 9900 | 9700 | 10400 | 9800 |
|  | B-1 Method | 15000 | 6800 | 16500 | 13000 | 12300 | 15000 | 12500 |
| Water Pressure Resistance [kPa] | 3-Point Leak | 73 | 61 | 68 | 67 | 62 | 73 | 85 |
|  | 10-Point Leak | 88 | 105 | 82 | 86 | 91 | 88 | 102 |
|  | Whole-Surface Leak | 114 | 138 | 109 | 136 | 133 | 114 | 147 |

|  |  |  | Comparative Examples | | | |
|---|---|---|---|---|---|---|
|  |  |  | 1 | 2 | 3 | 4 |
| Calcium Carbonate Fine Particles | Average Particle Diameter [μm] |  | 1 | 1 | 1 | 0.15 |
|  | Rate based upon Total Solid Content [wt %] |  | 4 | 78 | 40 | 42 |
|  | Rate based upon Synthetic Polymer [wt %] |  | 4 | 370 | 70 | 74 |
| Exposed to Gas phase Water fog Being Dispersed |  |  | Yes | Yes | No | No |
| Aftertreatment of Water Repellent Finishing |  |  | No | No | No | No |
| Evaluations | Microporous layer | State | Honeycomb skin core | Single Layer | Honeycomb skin core | Honeycomb skin core |
|  |  | Thickness [μm] | 44 | 40 | 56 | 41 |
|  |  | Tensile Strength [MPa] | 10.3 | 2.8 | 4.7 | 4.3 |
|  |  | Number of Micropores Having Pore Diameter of 0.1-5 μm [number/mm²] | — | 88 × 10⁴ | — | — |
|  |  | Number of Pores Having Pore Diameter of >5 μm [number/mm²] | 2800 | 500 | 3100 | 3000 |
|  |  | Area Ratio of Pores Having Pore Diameter of >5 μm [%] | 55 | 11 | 70 | 67 |
|  |  | Maximum Pore Diameter [μm] | 36 | 9 | 44 | 33 |
|  |  | Ratio Based Upon Film Thickness [%] | 82% | 23% | 79% | 80% |
|  | Moisture Permeability [g/m² · 24 hrs] | A-1 Method | 5800 | 10700 | 10500 | 9800 |
|  |  | B-1 Method | 4000 | 16800 | 15000 | 16800 |
|  | Water Pressure Resistance [kPa] | 3-Point Leak | 85 | 45 | 58 | 56 |
|  |  | 10-Point Leak | 105 | 61 | 77 | 71 |
|  |  | Whole-Surface Leak | 141 | 98 | 89 | 80 |

TABLE 2

|  |  |  | Examples | | | | | | | |
|---|---|---|---|---|---|---|---|---|---|---|
|  |  |  | 8 | 9 | 10 | 11 | 12 | 13 | 14 | 15 |
| silicon dioxide Fine Particles | Average Particle Diameter [μm] |  | 1.2 | 1.2 | 1.2 | 0.007 | 0.014 | 1.5 | 1.2 | 1.2 |
|  | Rate based upon Total Solid Content [wt %] |  | 30 | 18 | 50 | 30 | 30 | 30 | 30 | 30 |
|  | Rate based upon Synthetic Polymer [wt %] |  | 44 | 22 | 104 | 44 | 44 | 44 | 44 | 44 |
| Exposed to Gas phase Water fog Dispersed |  |  | Yes | Yes | Yes | Yes | Yes | Yes | (Spray) | Yes |
| Aftertreatment of Water Repellent Finishing |  |  | No | No | No | No | No | No | No | Yes |
| Evaluations | Microporous layer | State | Single Layer | Single Layer | Single Layer | Single Layer | Single Layer | Single Layer | Single Layer | Single Layer |
|  |  | Thickness [μm] | 44 | 48 | 50 | 18 | 21 | 46 | 44 | 44 |
|  |  | Tensile Strength [MPa] | 5.2 | 9.7 | 4.2 | 6.3 | 6.0 | 5.1 | 5.2 | 5.2 |
|  |  | Number of Micropores Having Pore Diameter of 0.1-5 μm [number/mm²] | 76 × 10⁴ | 96 × 10⁴ | 85 × 10⁴ | 31 × 10⁴ | 43 × 10⁴ | 70 × 10⁴ | 76 × 10⁴ | 76 × 10⁴ |

TABLE 2-continued

|  |  |  |  |  |  |  |  |  |  |
|---|---|---|---|---|---|---|---|---|---|
|  | Number of Pores Having Pore Diameter of >5 μm [number/mm²] | 180 | 550 | 430 | 90 | 100 | 200 | 180 | 170 |
|  | Area Ratio of Pores Having Pore Diameter of >5 μm [%] | 7 | 18 | 13 | 3 | 5 | 8 | 11 | 7 |
|  | Maximum Pore Diameter [μm] | 10 | 16 | 5 | 3 | 4 | 10 | 12 | 11 |
|  | Ratio Based Upon Film Thickness [%] | 23% | 33% | 10% | 17% | 19% | 22% | 27% | 25% |
| Moisture Permeability [g/m² · 24 hrs] | A-1 Method | 12000 | 9800 | 11500 | 11500 | 11200 | 12000 | 12000 | 10000 |
|  | B-1 Method | 14900 | 10600 | 15000 | 19400 | 18000 | 14400 | 14900 | 12500 |
| Water Pressure Resistance [kPa] | 3-Point Leak | 66 | 62 | 72 | 88 | 83 | 65 | 66 | 78 |
|  | 10-Point Leak | 89 | 139 | 90 | 105 | 102 | 90 | 89 | 100 |
|  | Whole-Surface Leak | 170 | 194 | 172 | 150 | 160 | 162 | 170 | 178 |

|  |  |  | Comparative Examples | | | |
|---|---|---|---|---|---|---|
|  |  |  | 5 | 6 | 7 | 8 |
| | silicon dioxide Fine Particles | Average Particle Diameter [μm] | 1.2 | 1.2 | 1.2 | 0.014 |
| | | Rate based upon Total Solid Content [wt %] | 3 | 81 | 30 | 30 |
| | | Rate based upon Synthetic Polymer [wt %] | 4 | 444 | 44 | 44 |
| Exposed to Gas phase Water fog Dispersed | | | Yes | Yes | No | No |
| Aftertreatment of Water Repellent Finishing | | | No | No | No | No |
| Evaluations | Microporous layer | State | Honey-comb skin core | Single Layer | Honey-comb skin core | Honey-comb skin core |
| | | Thickness [μm] | 44 | 40 | 41 | 42 |
| | | Tensile Strength [MPa] | 10.1 | 2.9 | 2.7 | 6.3 |
| | | Number of Micropores Having Pore Diameter of 0.1-5 μm [number/mm²] | — | 97 × 10⁴ | — | — |
| | | Number of Pores Having Pore Diameter of >5 μm [number/mm²] | 3100 | 480 | 2500 | 2700 |
| | | Area Ratio of Pores Having Pore Diameter of >5 μm [%] | 60 | 12 | 72 | 62 |
| | | Maximum Pore Diameter [μm] | 36 | 15 | 38 | 33 |
| | | Ratio Based Upon Film Thickness [%] | 82% | 38% | 93% | 79% |
| | Moisture Permeability [g/m² · 24 hrs] | A-1 Method | 6700 | 12000 | 12200 | 12000 |
| | | B-1 Method | 5800 | 16500 | 15100 | 19600 |
| | Water Pressure Resistance [kPa] | 3-Point Leak | 62 | 48 | 55 | 58 |
| | | 10-Point Leak | 97 | 72 | 102 | 88 |
| | | Whole-Surface Leak | 138 | 98 | 141 | 110 |

INDUSTRIAL APPLICABILITY

The moisture-permeable waterproof fabric of the present invention can be suitably used as a clothing material for sporting and outdoor activities.

The invention claimed is:

1. A process for producing a moisture-permeable waterproof fabric which comprises applying a synthetic polymer solution comprising a synthetic polymer consisting mainly of a polyurethane resin, 5-75% by weight of fine inorganic particles based on the total solid content and a polar organic solvent to one surface of a fibrous fabric, bringing said synthetic polymer solution into contact with a gas phase to make the synthetic polymer into a state of semi-coagulation, wherein the gas phase contains water fog having uniformly dispersed water particles that have an average particle diameter of 1-30 μm, and subsequently, immersing in water said fibrous fabric having thereon said synthetic polymer solution to completely coagulate the synthetic polymer.

2. The process for producing a moisture-permeable waterproof fabric according to claim 1, wherein said step of bringing into contact with said gas phase is carried out by exposing said synthetic polymer solution to a gas phase, wherein the gas phase contains water fog having uniformly dispersed water particles that have an average particle diameter of 1-30 μm.

3. The process for producing a moisture-permeable waterproof fabric according to claim 1, wherein said step of bringing into contact with said gas phase is carried out by spraying a gas phase onto said synthetic polymer solution, wherein the gas phase contains water fog having uniformly dispersed water particles that have an average particle diameter of 1-30 μm.

4. A process for producing a moisture-permeable waterproof fabric which comprises applying a synthetic polymer solution comprising a synthetic polymer consisting mainly of a polyurethane resin, 5-75% by weight of fine inorganic particles based on the total solid content and a polar organic solvent to a releasable base material,
- bringing said synthetic polymer solution into contact with a gas phase to make the synthetic polymer into a state of semi-coagulation, wherein the gas phase contains water fog having uniformly dispersed water particles that have an average particle diameter of 1-30 μm, immersing in water said releasable base material having thereon said synthetic polymer solution to completely coagulate the synthetic polymer to form a microporous layer film, and subsequently, laminating said microporous layer film to one surface of a fibrous fabric via an adhesive to produce a moisture-permeable waterproof fabric.

5. The process for producing a moisture-permeable waterproof fabric according to claim 4, wherein said step of bringing into contact with said gas phase is carried out by exposing said synthetic polymer solution to a gas phase, wherein the gas phase contains water fog having uniformly dispersed water particles that have an average particle diameter of 1-30 μm.

6. The process for producing a moisture-permeable waterproof fabric according to claim 4, wherein said step of bringing into contact with said gas phase is carried out by spraying a gas phase onto said synthetic polymer solution, wherein the gas phase contains water fog having uniformly dispersed water particles that have an average particle diameter of 1-30 μm.

* * * * *